US012573726B2

(12) United States Patent
Xu et al.

(10) Patent No.: US 12,573,726 B2
(45) Date of Patent: Mar. 10, 2026

(54) BATTERY CELL, BATTERY, AND ELECTRICAL APPARATUS

(71) Applicant: CONTEMPORARY AMPEREX TECHNOLOGY CO., LIMITED, Ningde (CN)

(72) Inventors: Hu Xu, Ningde (CN); Siying Huang, Ningde (CN); Jipeng Guo, Ningde (CN); Jiao Dong, Ningde (CN); Shaojun Niu, Ningde (CN); Rui Yang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/303,381

(22) Filed: Aug. 19, 2025

(65) Prior Publication Data

US 2025/0372840 A1 Dec. 4, 2025

Related U.S. Application Data

(63) Continuation of application No. PCT/CN2024/073717, filed on Jan. 23, 2024.

(30) Foreign Application Priority Data

Sep. 14, 2023 (CN) .......................... 202311186328.2

(51) Int. Cl.
*H01M 50/566* (2021.01)
*H01M 10/0587* (2010.01)
(Continued)

(52) U.S. Cl.
CPC ..... *H01M 50/566* (2021.01); *H01M 10/0587* (2013.01); *H01M 50/107* (2021.01);
(Continued)

(58) Field of Classification Search
None
See application file for complete search history.

(56) References Cited

U.S. PATENT DOCUMENTS

2020/0144676 A1 5/2020 Tsuruta et al.

FOREIGN PATENT DOCUMENTS

CN 110957466 A 4/2020
CN 216120653 U 3/2022
(Continued)

OTHER PUBLICATIONS

Machine translation of CN 218887468U, Apr. 18, 2023.*
(Continued)

*Primary Examiner* — Jonathan Crepeau
(74) *Attorney, Agent, or Firm* — K&L Gates LLP

(57) ABSTRACT

The present application relates to a battery cell, a battery, and an electrical apparatus in the field of battery technologies. The battery cell includes a case assembly, an end cover, and an electrode assembly. The case assembly defines an accommodating cavity with an opening, and includes first and second electrode lead-out portions positioned at one end of the case opposite the opening along a first direction. The end cover seals the opening. The electrode assembly, positioned inside the cavity, includes a main body, a first tab, and a second tab of opposite polarity. Both tabs are arranged at one end of the main body away from the end cover and are electrically connected to the corresponding lead-out portions. The end cover includes a pressure relief portion configured to release internal pressure. This design facilitates the integration of pressure relief features and simplifies the structural arrangement of the battery cell.

17 Claims, 6 Drawing Sheets

(51) Int. Cl.

| | |
|---|---|
| *H01M 50/107* | (2021.01) |
| *H01M 50/152* | (2021.01) |
| *H01M 50/231* | (2021.01) |
| *H01M 50/342* | (2021.01) |
| *H01M 50/474* | (2021.01) |
| *H01M 50/55* | (2021.01) |
| *H01M 50/559* | (2021.01) |

(52) U.S. Cl.

CPC ....... *H01M 50/152* (2021.01); *H01M 50/231*
(2021.01); *H01M 50/3425* (2021.01); *H01M*
*50/474* (2021.01); *H01M 50/55* (2021.01);
*H01M 50/559* (2021.01)

(56) References Cited

FOREIGN PATENT DOCUMENTS

| | | | |
|---|---|---|---|
| CN | 216120665 U | 3/2022 | |
| CN | 216488284 U | 5/2022 | |
| CN | 218887283 U | 4/2023 | |
| CN | 218887468 U | 4/2023 | |
| CN | 218887472 U | 4/2023 | |
| CN | 219123438 U | 6/2023 | |
| CN | 219321570 U | 7/2023 | |
| CN | 116914233 A | 10/2023 | |
| CN | 116914278 A | 10/2023 | |
| CN | 116936952 A | 10/2023 | |
| WO | 2022158856 A1 | 7/2022 | |
| WO | 2023092450 A1 | 6/2023 | |
| WO | 2023130280 A1 | 7/2023 | |

OTHER PUBLICATIONS

International Search Report in the international application No. PCT/CN2024/073717, mailed on May 17, 2024, 7 pages with English translation.

Written Opinion of the International Search Authority in the international application No. PCT/CN2024/073717, mailed on May 17, 2024, 7 pages with English translation.

The First Office Action received in the counterpart CN application 202311186328.2, mailed on Oct. 26, 2023, 17 pages with English translation.

The Second Office Action received in the counterpart CN application 202311186328.2, mailed on Nov. 21, 2023, 17 pages with English translation.

The Grant Notice received in the counterpart CN application 202311186328.2, mailed on Dec. 1, 2023, 4 pages with English translation.

* cited by examiner

28

BATTERY CELL, BATTERY, AND ELECTRICAL APPARATUS

CROSS-REFERENCE TO RELATED APPLICATIONS

The present application is a continuation of International Application No. PCT/CN2024/073717, filed on Jan. 23, 2024, which claims the priority of Chinese Patent Application No. 2023111863282 filed on Sep. 14, 2023 and entitled "BATTERY CELL, BATTERY, AND ELECTRICAL APPARATUS", which is incorporated herein by reference in its entirety.

TECHNICAL FIELD

The present application relates to the field of battery technologies, and in particular, to a battery cell, a battery, and an electrical apparatus.

BACKGROUND

In recent years, new energy vehicles have made a leap forward in development. In the field of electric vehicles, power batteries, as power sources of electric vehicles, play an irreplaceable and important role. With the vigorous promotion of new energy vehicles, the demand for power battery products is also growing. Batteries, as core components of new energy vehicles, have high requirements in terms of operational reliability. The battery cell usually includes a shell and an electrode assembly accommodated in the shell. However, the existing battery cells are difficult to manufacture during the process, which is not conducive to improving the production efficiency of the battery cells.

SUMMARY OF THE INVENTION

Embodiments of the present application provide a battery cell, a battery, and an electrical apparatus, which are capable of effectively improving the production efficiency of the battery cell.

In a first aspect, an embodiment of the present application provides a battery cell, including a case assembly, an end cover, and an electrode assembly. An accommodating cavity having an opening is formed inside the case assembly, and the case assembly has a first electrode lead-out portion and a second electrode lead-out portion. In a first direction, the first electrode lead-out portion and the second electrode lead-out portion are both located at one end of the case assembly away from the opening. The case assembly includes a case and an electrode terminal, the case includes a first wall and a second wall. The second wall is arranged around the first wall, and in the first direction, one end of the second wall is connected to the first wall, and the other end encloses to form the opening. The first wall and the second wall jointly enclose to form the accommodating cavity. The electrode terminal is mounted on the first wall in an insulated manner, the electrode terminal is the first electrode lead-out portion, and the first wall is the second electrode lead-out portion. The end cover covers the opening, and a pressure relief portion is arranged on the end cover. The pressure relief portion is configured to be capable of relieving an internal pressure of the battery cell. The electrode assembly is accommodated in the accommodating cavity, the electrode assembly includes a main body part, a first tab, and a second tab, and the first tab and the second tab have opposite polarities. The first tab and the second tab are both arranged at one end of the main body part away from the end cover in the first direction. The first tab and the second tab are electrically connected to the first electrode lead-out portion and the second electrode lead-out portion respectively. The first current collecting member is arranged between the first wall and the electrode assembly, and the first current collecting member connects the first tab and the electrode terminal. The main body part is provided with a through hole, and the through hole passes through both ends of the main body part in the first direction. The first current collecting member is welded to the electrode terminal and forms a weld mark, and in the first direction, at least part of a projection of the weld mark is located in the through hole.

In the above technical solution, by arranging both the first tab and the second tab of the electrode assembly at the same end of the main body part in the first direction, it is conducive to saving space occupied by the electrode assembly, so as to improve energy density of the battery cell having such an electrode assembly. The battery cell includes the case assembly and the end cover. The first electrode lead-out portion and the second electrode lead-out portion of the case assembly for electrically connecting to the first tab and the second tab of the electrode assembly are both arranged at one end of the case assembly away from the opening in the first direction. The end cover covers the opening and the pressure relief portion is arranged on the end cover, so that the pressure relief portion arranged on the end cover is a structure located on the side of the electrode assembly away from the first tab and the second tab, and the end cover and the case assembly are separately arranged structures, which is conducive to reducing the difficulty of arranging the pressure relief portion on the battery cell, thereby reducing the difficulty of manufacturing the battery cell, and further being capable of effectively improving the production efficiency of the battery cell. The case assembly is provided with the case and the electrode terminal, the case includes the first wall arranged opposite to the end cover in the first direction and the second wall arranged around the first wall, and the electrode terminal is mounted on the first wall of the case in an insulated manner. By setting the electrode terminal as the first electrode lead-out portion electrically connected to the first tab, and setting the first wall as the second electrode lead-out portion electrically connected to the second tab, the electrode terminal and the first wall of the case assembly are respectively used as output electrodes of the battery cell, so that the first electrode lead-out portion and the second electrode lead-out portion are both located at one end of the case assembly away from the opening, and the structure is simple, easy to implement, and capable of reducing the difficulty of assembling the battery cell. In addition, the first current collecting member is arranged between the first wall and the electrode assembly, and the first current collecting member is connected to the first tab and the electrode terminal to realize the electrical connection between the first tab and the electrode terminal, which is conducive to reducing the difficulty of electrically connecting the first tab and the electrode terminal to each other. By arranging the through hole penetrating through both ends of the main body part in the first direction on the main body part, and arranging at least part of the projection of the weld mark formed by the mutual welding connection between the first current collecting member and the electrode terminal in the first direction to be located in the through hole, a projection of a region where the first current collecting member and the electrode terminal overlap and are welded to each other in the first direction is capable of being located in the through hole, so that when the first current collecting member and the electrode terminal are welded, the first current collecting member and the electrode terminal are capable of being welded together through the through hole from the opening of the case, thereby eliminating the need to perform penetration welding on the electrode terminal and the first current collecting member from one side of the first wall of the case away from the electrode assembly, which is conducive to reducing the welding difficulty and the power required for welding between the first current collecting member and the electrode terminal. There is no need to reduce the thickness of the electrode terminal or locally thin the electrode terminal or set the electrode terminal to a hollow structure in order to weld the first current collecting member and the electrode terminal from the side of the first wall of the case away from the electrode assembly, which is conducive to improving the structural strength of the electrode terminal and reducing the difficulty of processing the electrode terminal, thereby reducing the difficulty of manufacturing the battery cell and being conducive to improving the production efficiency of the battery cell.

In some embodiments, the pressure relief portion and the end cover are integrally formed.

In the above technical solution, by arranging the pressure relief portion and the end cover as an integrally formed structure, the structural stability of the pressure relief portion arranged on the end cover is capable of being improved, which is conducive to reducing the risk such as falling off of the pressure relief portion.

In some embodiments, the pressure relief portion and the end cover are separately arranged.

In the above technical solution, by arranging the pressure relief portion and the end cover as separately arranged structures, the pressure relief portion and the end cover are independent components, which is convenient for assembling and conducive to optimizing the production rhythm.

In some embodiments, the electrode assembly is a wound electrode assembly, and the through hole is a center hole of the main body part.

In the above technical solution, by setting the electrode assembly as the electrode assembly of a wound structure, and making the center hole of the main body part of the electrode assembly after winding to be the through hole, there is no need to set a through hole separately on the main body part of the electrode assembly, which is conducive to reducing the difficulty of manufacturing the battery cell and conducive to optimizing the production rhythm of the battery cell.

In some embodiments, the battery cell further includes a second current collecting member; the second current collecting member is arranged between the first wall and the electrode assembly, the second current collecting member and the first current collecting member are arranged at an interval, and the second current collecting member connects the second tab and the first wall.

In the above technical solution, the second current collecting member is arranged between the first wall and the electrode assembly, and the second current collecting member connects the second tab and the first wall to achieve electrical connection between the second tab and the first wall, which is conducive to reducing the difficulty of mutual electrical connection between the second tab and the first wall. In addition, by arranging the first current collecting member at an interval from the second current collecting member, a short circuit phenomenon between the first current collecting member and the second current collecting member can be reduced, which is conducive to reducing the risk during use of the battery cell.

In some embodiments, the battery cell further includes a first insulating member, the first insulating member is arranged between the electrode assembly and the first wall, and the first insulating member insulates and isolates the first current collecting member from the second current collecting member.

In the above technical solution, by arranging the first insulating member between the electrode assembly and the first wall, and the first insulating member being configured to insulate and isolate the first current collecting member from the second current collecting member, insulation and isolation between the first current collecting member and the second current collecting member are capable of being achieved, which is conducive to further reducing the risk of short circuit between the first current collecting member and the second current collecting member.

In some embodiments, the first insulating member is provided with a first mounting hole and a second mounting hole arranged at an interval, the first current collecting member is arranged in the first mounting hole, and the second current collecting member is arranged in the second mounting hole.

In the above technical solution, the first mounting hole and the second mounting hole are arranged at an interval on the first insulating member, and the first current collecting member and the second current collecting member are respectively arranged in the first mounting hole and the second mounting hole, on the one hand, the first current collecting member and the second current collecting member are capable of being assembled to the first insulating member, so that the first insulating member is capable of supporting and assembling the first current collecting member and the second current collecting member, which is conducive to reducing the difficulty of arranging the first current collecting member and the second current collecting member between the first wall and the electrode assembly. On the other hand, the first current collecting member and the second current collecting member are capable of being arranged at an interval on the first insulating member to achieve insulation and isolation between the first current collecting member and the second current collecting member.

In some embodiments, the first insulating member includes a first insulator and a second insulator; the first insulator is an annular structure; the second insulator is connected to the first insulator, and the second insulator is configured to separate an internal space of the first insulator into the first mounting hole and the second mounting hole, and the second insulator is located between the first current collecting member and the second current collecting member.

In the above technical solution, the first insulating member is provided with the first insulator of an annular structure and the second insulator connected to an inner side of the first insulator, and the second insulator is configured to separate the internal space of the first insulator into the first mounting hole and the second mounting hole, so that the first insulator and the second insulator jointly define the first mounting hole and the second mounting hole for assembling the first current collecting member and the second current collecting member. The first insulating member with such a structure is capable of, on the one hand, surrounding around outer sides of the first current collecting member and the second current collecting member by the first insulator, so that the first current collecting member and the second current collecting member are capable of being separated from the second wall of the case, which is conducive to reducing the risk of short circuit between the first current collecting member and the second current collecting member and the second wall of the case. On the other hand, the first current collecting member and the second current collecting member are capable of being separated by the second insulator, which is conducive to reducing the risk of short circuit between the first current collecting member and the second current collecting member.

In some embodiments, in the first direction, a protrusion is arranged to protrude from one side of the second current collecting member facing the first wall, and the protrusion is connected to the first wall.

In the above technical solution, the protrusion is arranged to protrude from the side of the second current collecting member facing the first wall so that the second current collecting member is connected to the first wall through the protrusion, which is conducive to reducing the assembling difficulty between the first wall and the second current collecting member, and is capable of improving a contact effect between the second current collecting member and the first wall.

In some embodiments, in the first direction, a groove is formed in a region on one side of the second current collecting member away from the first wall and corresponding to the protrusion.

In the above technical solution, by forming the groove in the region of the second current collecting member on the side away from the protrusion and corresponding to the protrusion, the protrusion of the second current collecting member may be a concave-convex structure that can be formed by stamping, and therefore, it is capable of forming the protrusion and the groove on two sides of the second current collecting member, respectively. The current collecting member with such a structure is easy to manufacture and it is conducive to reducing the difficulty in processing the protrusion, thereby improving the processing efficiency of arranging the protrusion on the second current collecting member.

In some embodiments, in the first direction, the first current collecting member has a first surface facing the first wall, and the electrode terminal is connected to the first surface. The second current collecting member has a second surface facing the first wall, and the protrusion is arranged on the second surface. The first surface is flush with the second surface; or, in the first direction, the first surface is closer to the first wall than the second surface.

In the above technical solution, by setting the first surface of the first current collecting member to be a structure flush with the second surface of the second current collecting member or closer to the first wall than the second surface of the second current collecting member, the protrusion arranged on the second surface of the second current collecting member is capable of compensating for a gap between the second surface and the first wall, so that the second current collecting member is capable of being connected to the first wall and the contact effect between the second current collecting member and the first wall is capable of being improved.

In some embodiments, in the first direction, the first tab has a third surface facing the first wall, the first current collecting member is connected to the third surface, the second tab has a fourth surface facing the first wall, and the second current collecting member is connected to the fourth surface, where the third surface is flush with the fourth surface.

In the above technical solution, by setting the third surface of the first tab facing the first wall and the fourth surface of the second tab facing the first wall to be structures flush with each other, on the one hand, it is convenient to process the first tab and the second tab, and on the other hand, it is capable of achieving that the first current collecting member and the second current collecting member are structures flush with each other on the side facing the electrode assembly in the first direction, so as to reduce a position difference between the first current collecting member and the second current collecting member in the first direction, thereby being conducive to reducing the difficulty of assembling the first current collecting member and the second current collecting member between the electrode assembly and the first wall, and being conducive to improving the internal space utilization of the battery cell.

In some embodiments, the first wall and the second wall are separately arranged.

In the above technical solution, by arranging the first wall and the second wall as separate structures, it is conducive to reducing the difficulty of assembling the electrode terminal on the first wall, and conducive to reducing the difficulty of assembling between the electrode terminal and the first tab and between the first wall and the second tab, thereby being conducive to reducing the difficulty of manufacturing the battery cell to improve the production efficiency of the battery cell.

In some embodiments, the first wall and the second wall are integrally formed.

In the above technical solution, by arranging the first wall and the second wall as an integrated structure, on the one hand, the connection stability and reliability between the first wall and the second wall are capable of being improved, which is conducive to improving the overall structural strength of the case. On the other hand, an influence caused by a stress generated by the mutual assembling connection between the first wall and the second wall on components such as the electrode terminal is capable of being reduced.

In some embodiments, in the first direction, a thickness of the end cover is $D_1$, meeting 0.3 mm≤$D_1$≤3.5 mm.

In the above technical solution, by setting the thickness of the end cover in the first direction to be greater than or equal to 0.3 mm, the end cover has sufficient structural strength, which is conducive to reducing the risk of deformation of or damage to the end cover during use or assembling, and the end cover has sufficient space to arrange the pressure relief portion on the end cover, which is conducive to reducing the difficulty of arranging the pressure relief portion on the end cover. In addition, by setting the thickness of the end cover in the first direction to be less than or equal to 3.5 mm, the space occupied by the end cover in the first direction is saved, which is conducive to improving the energy density of the battery cell.

In some embodiments, the battery cell is cylindrical, and a central axis of the battery cell extends in the first direction.

In the above technical solution, the battery cell is set to be cylindrical so as to facilitate processing to form the battery cell of a cylindrical structure, so that the battery cell has advantages such as high capacity, long cycle life, and a wide range of ambient temperature.

In some embodiments, a diameter of the battery cell is $D_2$, meeting 27 mm≤$D_2$≤100 mm.

In the above technical solution, by setting the diameter of the battery cell to be greater than or equal to 27 mm, there is enough space inside the battery cell to accommodate the electrode assembly, which is conducive to reducing an interference phenomenon between the first tab and the second tab located at the same end of the main body part of the electrode assembly. In addition, by setting the diameter of the battery cell to be less than or equal to 100 mm, a phenomenon of an excessively large number of electrode plate layers in the electrode assembly caused by the excessively large internal space of the battery cell can be alleviated, which is conducive to reducing a phenomenon of stress accumulation caused by the excessively large number of the electrode plate layers in the electrode assembly.

In a second aspect, an embodiment of the present application further provides a battery, including the above-mentioned battery cell.

In a third aspect, an embodiment of the present application further provides an electrical apparatus, including the above-mentioned battery cell, the battery cell being configured to provide electric energy.

DESCRIPTION OF THE DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

Figure 1:
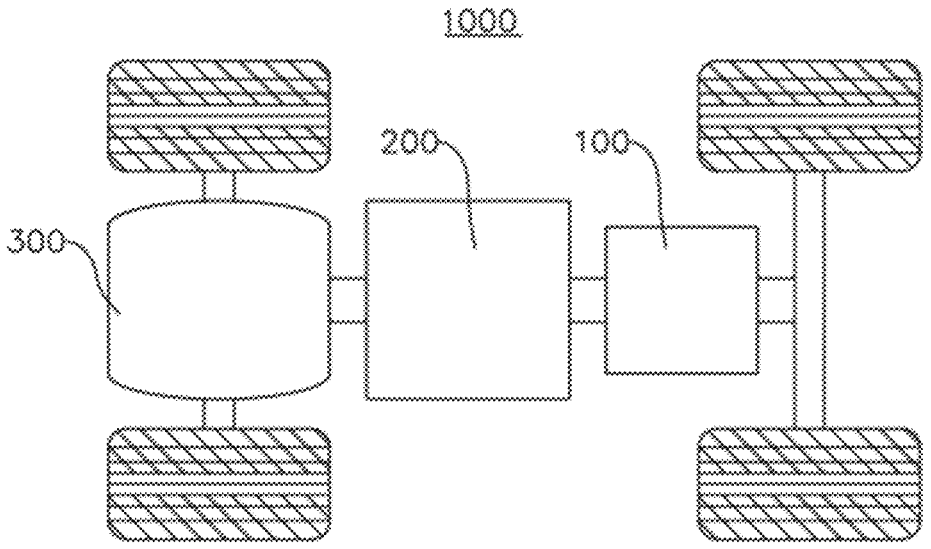
FIG. 1 is a schematic structural diagram of a vehicle according to some embodiments of the present application.

Reference numerals: 1000—Vehicle; 100—Battery; 10—Box; 11—First box body; 12—Second box body; 20—Battery cell; 21—Case assembly; 211—Accommodating cavity; 212—Opening; 213—First electrode lead—out portion; 214—Second electrode lead—out portion; 215—Case; 2151—First wall; 2151a—Assembly hole; 2152—Second wall; 216—Electrode terminal; 22—End cover; 221—Pressure relief portion; 222—Score groove; 23—Electrode assembly; 231—Main body part; 2311—Through hole; 232—First tab; 2321—Third surface; 233—Second tab; 2331—Fourth surface; 24—Second insulating member; 25—First current collecting member; 251—First surface; 26—Weld mark; 27—Second current collecting member; 271—Protrusion; 272—Groove; 273—Second surface; 28—First insulating member; 281—First mounting hole; 282—Second mounting hole; 283—First insulator; 284—Second insulator; 200—Controller; 300—Motor; X—First direction.

DETAILED DESCRIPTION

In order to make the objects, technical solutions, and advantages of embodiments of the present application clearer, the technical solutions in the embodiments of the present application will be clearly described below with reference to the drawings for the embodiments of the present application. Apparently, the described embodiments are some of, rather than all of, the embodiments of the present application. All the other embodiments obtained by a person of ordinary skill in the art based on the embodiments of the present application without any creative effort shall fall within the scope of protection of the present application.

Unless otherwise defined, all technical and scientific terms used in the present application shall have the same meanings as those generally understood by those skilled in the art of the present application. The terms used in the present application in the specification of application are merely for the purpose of describing specific embodiments and are not intended to limit the present application. The terms "include" and "have" and any variations thereof in the specification and claims and the above brief description of the drawings of the present application are intended to cover non-exclusive inclusion. The terms "first", "second", and the like in the specification and the claims of the present application as well as the above drawings are used to distinguish different objects, rather than to describe a specific order or primary-secondary relationship.

The phrase "embodiment" referred to in the present application means that the descriptions of specific features, structures, and characteristics in combination with the embodiment are included in at least one embodiment of the present application. The appearance of this phrase in various places in the specification does not necessarily refer to the same embodiment, nor is it a separate or alternative embodiment that is mutually exclusive with other embodiments.

In the description of the present application, it should be noted that the terms "mounting", "connecting", "connection", and "attachment" should be understood in a broad sense, unless otherwise explicitly specified or defined, for example, it may be a fixed connection, a detachable connection or an integrated connection; and may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relation describing associated objects, which means that there may be three relations, for example, A and/or B may represent three situations: A exists alone, both A and B exist, and B exists alone. In addition, the character "/" in the present application generally means that the associated objects before and after it are in an "or" relationship.

In the embodiments of the present application, the same reference numerals denote the same components, and for the sake of brevity, detailed descriptions of the same components are omitted in different embodiments. It should be understood that the thickness, length, width and other dimensions of the various components in the embodiments of the present application shown in the drawings, as well as the overall thickness, length, width and other dimensions of an integrated apparatus, are for illustrative purposes only, and should not constitute any limitation to the present application.

In the present application, the "plurality of" refers to more than two (including two).

In the embodiments of the present application, a battery cell may be a secondary battery. The secondary battery refers to a battery cell that, after being discharged, can activate an active material by charging for continued use.

The battery cell may be a lithium-ion battery, a sodium-ion battery, a sodium/lithium-ion battery, a lithium metal battery, a sodium metal battery, a lithium sulfur battery, a magnesium-ion battery, a nickel hydrogen battery, a nickel cadmium battery, a lead storage battery, and the like. The embodiments of the present application are not limited to this.

The battery cell generally includes an electrode assembly. The electrode assembly includes a positive electrode, a negative electrode, and a spacer. During charging and discharging of the battery cell, active ions (such as lithium ions) are intercalated and deintercalated back and forth between the positive electrode and the negative electrode. The spacer is arranged between the positive electrode and the negative electrode, and can function to prevent short circuit between the positive electrode and the negative electrode and allow the active ions to pass through.

In some embodiments, the positive electrode may be a positive electrode plate, and the positive electrode plate may include a positive electrode current collector and a positive electrode active material arranged on at least one surface of the positive electrode current collector.

As an example, the positive electrode current collector has two surfaces opposite in its own thickness direction, and the positive electrode active material is arranged on either one or both of the two opposite surfaces of the positive electrode current collector.

As an example, the positive electrode current collector may be a metal foil or composite current collector. For example, if it is the metal foil, silver-plated aluminum, silver-plated stainless steel, stainless steel, copper, aluminum, nickel, carbon-fine electrode, carbon, nickel, titanium, or the like can be adopted. The composite current collector may include a high molecular material substrate and a metal layer. The composite current collector may be formed by forming a metal material (such as aluminum, aluminum alloy, nickel, nickel alloy, titanium, titanium alloy, silver, and silver alloy) on a high molecular material substrate (such as a substrate of polypropylene, polyethylene terephthalate, polybutylene terephthalate, polystyrene, or polyethylene).

As an example, the positive electrode active material may include at least one of the following materials: a lithium-containing phosphate, a lithium transition metal oxide, and a respective modified compound thereof. However, the present application is not limited to these materials, and other conventional materials useful as positive electrode active materials for batteries can also be used. One of these positive active materials may be used alone, or two or more of these positive active materials may be used in combination. Examples of the lithium-containing phosphate may include, but are not limited to, at least one of lithium iron phosphate (e.g., $LiFePO_4$ (also abbreviated as LFP)), lithium iron phosphate-carbon composite, lithium manganese phosphate (e.g., $LiMnPO_4$), lithium manganese phosphate-carbon composite, lithium iron manganese phosphate, and lithium iron manganese phosphate-carbon composite.

Examples of the lithium transition metal oxide may include, but are not limited to, at least one of lithium cobalt oxide (e.g., $LiCoO_2$), lithium nickel oxide (e.g., $LiNiO_2$), lithium manganese oxide (e.g., $LiMnO_2$, $LiMn_2O_4$), lithium nickel cobalt oxide, lithium manganese cobalt oxide, lithium nickel manganese oxide, lithium nickel cobalt manganese oxide (e.g., $LiNi_{1/3}Co_{1/3}Mn_{1/3}O_2$ (also abbreviated as $NCM_{333}$), $LiNi_{0.5}Co_{0.2}Mn_{0.3}O_2$ (also abbreviated as $NCM_{523}$), $LiNi_{0.5}Co_{0.25}Mn_{0.25}O_2$ (also abbreviated as $NCM_{211}$), $LiNi_{0.6}Co_{0.2}Mn_{0.2}O_2$ (also abbreviated as $NCM_{622}$), and $LiNi_{0.8}Co_{0.1}Mn_{0.1}O_2$ (also abbreviated as $NCM_{811}$)), lithium nickel cobalt aluminum oxide (e.g., $LiNi_{0.85}Co_{0.15}Al_{0.05}O_2$), and a modified compound thereof, and the like.

In some embodiments, a foam metal may be used as the positive electrode. The foam metal may be foam nickel, foam copper, foam aluminum, foam alloy, foam carbon, or the like. When the foam metal is used as the positive electrode, the surface of the foam metal may not be provided with a positive electrode active material, and of course, may also be provided with a positive electrode active material. For example, a lithium source material, a potassium metal, or a sodium metal may also fill or/and be deposited in the foam metal, and the lithium source material is a lithium metal and/or a lithium-rich material.

In some embodiments, the negative electrode may be a negative electrode plate, and the negative electrode plate may include a negative electrode current collector.

For example, a metal foil, a foam metal, or a composite current collector may be used as the negative electrode current collector. For example, as the metal foil, silver surface-treated aluminum or stainless steel, stainless steel, copper, aluminum, nickel, baked carbon, carbon, nickel, titanium, or the like can be used. The foam metal may be foam nickel, foam copper, foam aluminum, foam alloy, foam carbon, or the like. The composite current collector may include a high molecular material substrate and a metal layer. The composite current collector may be formed by forming a metal material (such as copper, copper alloy, nickel, nickel alloy, titanium, titanium alloy, silver, and silver alloy) on a polymer material substrate (such as a substrate of polypropylene, polyethylene terephthalate, polybutylene terephthalate, polystyrene, or polyethylene).

For example, the negative electrode plate may include a negative electrode current collector and a negative active material arranged on at least one surface of the negative electrode current collector.

For example, the negative electrode current collector has two surfaces opposite to each other in its own thickness direction, and the negative active material is arranged on either one or both of the two opposite surfaces of the negative electrode current collector.

For example, the negative active material for the battery cell that is commonly known in this field can be used as the negative active material. For example, the negative active material may include at least one of the following materials: artificial graphite, natural graphite, soft carbon, hard carbon, a silicon-based material, a tin-based material, lithium titanate, and the like. The silicon-based material may be selected from at least one of elemental silicon, silicon-oxygen compound, silicon-carbon complex, silicon-nitrogen complex, and silicon alloy. The tin-based material may be selected from at least one of elemental tin, tin-oxygen compound, and tin alloy. However, the present application is not limited to these materials, and other conventional materials useful as negative electrode active materials for batteries can also be used. One of these negative active materials may be used alone, or two or more of these negative active materials may be used in combination.

In some embodiments, the material of the positive electrode current collector may be aluminum, and the material of the negative electrode current collector may be copper.

In some implementations, the electrode assembly further includes a spacer, and the spacer is arranged between the positive electrode and the negative electrode.

In some implementations, the spacer is a separator. There may be various types of separators, and any well-known separator with a porous structure having good chemical stability and mechanical stability may be selected.

As an example, the material of the separator may include at least one of glass fiber, non-woven fabric, polyethylene, polypropylene, and polyvinylidene fluoride. The separator may be a single-layer film or a multi-layer composite film. When the separator is the multi-layer composite film, the materials of all layers can be the same or different. The spacer can be an independent component positioned between the positive electrode and the negative electrode, and can also be attached to the surfaces of the positive electrode and the negative electrode.

In some embodiments, the spacer is a solid electrolyte. The solid electrolyte is arranged between the positive electrode and the negative electrode and plays a role of transmitting ions and isolates the positive electrode from the negative electrode.

In some embodiments, the battery cell further includes an electrolyte, and the electrolyte plays a role in conducting ions between the positive electrode and the negative electrode. The electrolyte may be liquid, gel or solid. The liquid electrolyte includes electrolyte salt and a solvent.

In some embodiments, the electrolyte salt may include at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoroborate, lithium bis(oxalate)borate, lithium difluorooxalate phosphate and lithium tetrafluoroborate.

In some embodiments, the solvent may include at least one of ethylene carbonate, propylene carbonate, methyl ethyl carbonate, diethyl carbonate, dimethyl carbonate, dipropyl carbonate, methyl propyl carbonate, ethyl propyl carbonate, butyl carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, tetramethylene sulfone, dimethyl sulfone, methyl ethyl sulfone, and ethyl sulfone. The solvent can be ether solvents. The ether solvent may include one or more selected from the group consisting of ethylene glycol dimethyl ether, ethylene glycol diethyl ether, diethylene glycol dimethyl ether, tridiethylene glycol dimethyl ether, tetraethylene glycol dimethyl ether, 1,3-dioxolane, tetrahydrofuran, methyltetrahydrofuran, diphenyl ether, or crown ether.

The gel electrolyte includes a skeleton network with a polymer as the electrolyte, paired with an ionic liquid-lithium salt.

The solid electrolyte includes a polymer solid electrolyte, an inorganic solid electrolyte, and a composite solid electrolyte.

As an example, the polymer solid electrolyte can be polyether (polyoxyethylene), polysiloxane, polycarbonate, polyacrylonitrile, polyvinylidene fluoride, polymethyl methacrylate, a single-ion polymer, a polyionic liquid-lithium salt, cellulose and the like.

As an example, the inorganic solid electrolyte may include one or more of an oxide solid electrolyte (crystalline perovskite, a sodium superconducting ion conductor, garnet and an amorphous LiPON film), a sulfide solid electrolyte (a crystalline lithium superconducting ion conductor (lithium germanium phosphorus sulfur and sulfur silver germanium ore), and amorphous sulfide), a halide solid electrolyte, a nitride solid electrolyte and a hydride solid electrolyte.

As an example, the composite solid electrolyte is formed by adding an inorganic solid electrolyte filler into the polymer solid electrolyte.

In some implementations, the electrode assembly is of a wound structure. The positive electrode plate and the negative electrode plate are wound into the wound structure.

In some embodiments, the shape of the electrode assembly may be cylindrical.

In some embodiments, the electrode assembly is provided with a tab. The tab may conduct current out from the electrode assembly. The tab includes a positive tab and a negative tab.

In some implementations, the battery cell may include a shell. The shell is configured to encapsulate components such as the electrode assembly and the electrolyte. The shell may be a steel shell, an aluminum shell, a plastic shell (such as polypropylene), a composite metal shell (such as a copper-aluminum composite shell), an aluminum-plastic film, or the like.

As an example, the battery cell may be a cylindrical battery cell, a prismatic battery cell, a pouch cell, or a battery cell in another shape.

A battery mentioned in the embodiments of the present application is a single physical module including one or a plurality of battery cells to provide a higher voltage and capacity.

In some embodiments, the battery may be a battery module. When there are a plurality of battery cells, the plurality of battery cells are arranged and fixed to form a battery module.

In some embodiments, the battery may be a battery pack. The battery pack includes a box body and a battery cell. The battery cell or the battery module is accommodated in the box body.

In some embodiments, the box body may be a part of a vehicle chassis structure. For example, a part of the box body may become at least a part of a vehicle floor, or a part of the box body may become at least a part of a cross beam and a longitudinal beam of a vehicle.

In some embodiments, the battery may be an energy storage apparatus. The energy storage apparatus includes an energy storage container, an energy storage cabinet, or the like.

The battery has outstanding advantages such as high energy density, low environmental pollution, high power density, long service life, wide adaptability, and low self-discharge coefficient, thus being an important component of today's new energy development.

For a general battery cell, the battery cell usually includes a shell and an electrode assembly accommodated in the shell. The shell includes an end cover and an integrally formed case, and the end cover covers one end of the case. The electrode assembly is usually provided with a main body part and positive and negative tabs. The positive and negative tabs are configured to output or input electrical energy of the electrode assembly. In order to save the space occupied by the electrode assembly in the shell and to improve the energy density of the battery cell, especially in a battery cell of a cylindrical structure, in the related art, the positive and negative tabs of the electrode assembly are usually arranged at the same end of the main body part, and the electrode terminal is mounted on the end cover in an insulated manner, so as to weld one of the positive and negative tabs of the electrode assembly to the electrode terminal, and weld the other to the end cover, to output or input the positive and negative electrodes of the battery cell respectively through the end cover and the electrode terminal, thereby realizing the electrode assembly being a structure in which tabs are located on the same side, so as to save the space occupied by the electrode assembly in the shell. However, in a battery cell of this structure, an area of the end cover is limited, and therefore, a pressure relief portion for relieving an internal pressure of the battery cell is usually arranged on a bottom wall of the case arranged opposite to the end cover, so that it is difficult to arrange the pressure relief portion on the bottom wall, the manufacturing of the battery cell is difficult, and it is not conducive to improving the production efficiency of the battery cell.

Based on the above-mentioned considerations, in order to solve the problem of the large difficulty in the manufacturing process of the battery cell, an embodiment of the present application provides a battery cell, and the battery cell includes a case assembly, an end cover, and an electrode assembly. The case assembly is provided with an accommodating cavity having an opening formed therein, and the case assembly has a first electrode lead-out portion and a second electrode lead-out portion. In a first direction, the first electrode lead-out portion and the second electrode lead-out portion are both located at one end of the case assembly away from the opening. The case assembly includes a case and an electrode terminal. The case includes a first wall and a second wall. The second wall is arranged around the first wall. In the first direction, one end of the second wall is connected to the first wall, and the other end encloses to form the opening. The first wall and the second wall jointly enclose to form the accommodating cavity. The electrode terminal is mounted on the first wall in an insulated manner. The electrode terminal is the first electrode lead-out portion, and the first wall is the second electrode lead-out portion. The end cover covers the opening. The end cover is provided with a pressure relief portion, and the pressure relief portion is configured to relieve an internal pressure of the battery cell. The electrode assembly is accommodated in the accommodating cavity, and the electrode assembly includes a main body part, a first tab, and a second tab. The first tab and the second tab have opposite polarities. The first tab and the second tab are both arranged at one end of the main body part away from the end cover in the first direction. The first tab and the second tab are electrically connected to the first electrode lead-out portion and the second electrode lead-out portion, respectively. A first current collecting member is arranged between the first wall and the electrode assembly, and the first current collecting member connects the first tab and the electrode terminal. The main body part is provided with a through hole, and the through hole passes through both ends of the main body part in the first direction. The first current collecting member is welded to the electrode terminal to form a weld mark. At least part of a projection of the weld mark is located in the through hole in the first direction.

In the battery cell of this structure, by arranging the first tab and the second tab of the electrode assembly at the same end of the main body part in the first direction, it is conducive to saving space occupied by the electrode assembly, so as to improve energy density of the battery cell having such an electrode assembly. The battery cell includes the case assembly and the end cover. The first electrode lead-out portion and the second electrode lead-out portion of the case assembly for electrically connecting to the first tab and the second tab of the electrode assembly are both arranged at one end of the case assembly away from the opening in the first direction. The end cover covers the opening and the pressure relief portion is arranged on the end cover, so that the pressure relief portion arranged on the end cover is a structure located on the side of the electrode assembly away from the first tab and the second tab, and the end cover and the case assembly are separately arranged structures, which is conducive to reducing the difficulty of arranging the pressure relief portion on the battery cell, thereby reducing the difficulty of manufacturing the battery cell, and further being capable of effectively improving the production efficiency of the battery cell. The case assembly is provided with the case and the electrode terminal, the case includes the first wall arranged opposite to the end cover in the first direction and the second wall arranged around the first wall, and the electrode terminal is mounted on the first wall of the case in an insulated manner. By setting the electrode terminal as the first electrode lead-out portion electrically connected to the first tab, and setting the first wall as the second electrode lead-out portion electrically connected to the second tab, the electrode terminal and the first wall of the case assembly are respectively used as output electrodes of the battery cell, so that the first electrode lead-out portion and the second electrode lead-out portion are both located at one end of the case assembly away from the opening, and the structure is simple, easy to implement, and capable of reducing the difficulty of assembling the battery cell.

In addition, the first current collecting member is arranged between the first wall and the electrode assembly, and the first current collecting member is connected to the first tab and the electrode terminal to realize the electrical connection between the first tab and the electrode terminal, which is conducive to reducing the difficulty of electrically connecting the first tab and the electrode terminal to each other. By arranging the through hole penetrating through both ends of the main body part in the first direction on the main body part, and arranging at least part of the projection of the weld mark formed by the mutual welding connection between the first current collecting member and the electrode terminal in the first direction to be located in the through hole, a projection of a region where the first current collecting member and the electrode terminal overlap and are welded to each other in the first direction is capable of being located in the through hole, so that when the first current collecting member and the electrode terminal are welded, the first current collecting member and the electrode terminal are capable of being welded together through the through hole from the opening of the case, thereby eliminating the need to perform penetration welding on the electrode terminal and the first current collecting member from one side of the first wall of the case away from the electrode assembly, which is conducive to reducing the welding difficulty and the power required for welding between the first current collecting member and the electrode terminal. There is no need to reduce the thickness of the electrode terminal or locally thin the electrode terminal or set the electrode terminal to a hollow structure in order to weld the first current collecting member and the electrode terminal from the side of the first wall of the case away from the electrode assembly, which is conducive to improving the structural strength of the electrode terminal and reducing the difficulty of processing the electrode terminal, thereby reducing the difficulty of manufacturing the battery cell and being conducive to improving the production efficiency of the battery cell.

The battery cell disclosed in the embodiments of the present application can be used, but is not limited to, in an electrical apparatus, such as a vehicle, a ship, or an aircraft. A power source system of the electrical apparatus may be formed by the battery cell disclosed in the present application, a battery, and the like, which is conducive to reducing the difficulty in arranging a pressure relief portion on the battery cell to reduce the difficulty in manufacturing the battery cell, and it is capable of effectively improving production efficiency of the battery cell.

An embodiment of the present application provides an electrical apparatus in which a battery is used as a power source. The electrical apparatus may be, but is not limited to, a mobile phone, a tablet, a laptop computer, an electric toy, an electric tool, a storage battery car, an electric vehicle, a ship, a spacecraft, and the like. The electric toy may include fixed or mobile electric toys, such as game consoles, electric vehicle toys, electric ship toys, and electric airplane toys. The spacecraft may include airplanes, rockets, space shuttles, spaceships, etc.

For the convenience of description in the following embodiments, an electrical apparatus being a vehicle 1000 according to an embodiment of the present application is taken as an example for the description.

Referring to FIG. 1, FIG. 1 is a schematic structural diagram of a vehicle 1000 according to some embodiments of the present application. The vehicle 1000 may be a fuel vehicle, a gas vehicle, or a new energy vehicle. The new energy vehicle may be an all-electric vehicle, a hybrid vehicle, an extended-range vehicle, or the like. A battery 100 is provided in the vehicle 1000. The battery 100 may be arranged at the bottom of the vehicle 1000, or the head of the vehicle 1000, or the tail of the vehicle 1000. The battery 100 may be used for supplying power to the vehicle 1000. For example, the battery 100 may be used as an operating power source or usage power source for the vehicle 1000. The vehicle 1000 may further include a controller 200 and a motor 300. The controller 200 is used for controlling the battery 100 to supply power to the motor 300, for example, to satisfy the operating power demand when the vehicle 1000 is starting, navigating, and traveling.

In some embodiments of the present application, the battery 100 can not only be used as the operating power source or usage power source for the vehicle 1000, but also as the driving power source for the vehicle 1000, to replace or partially replace fuel or natural gas to provide driving power for the vehicle 1000.

Figure 2:
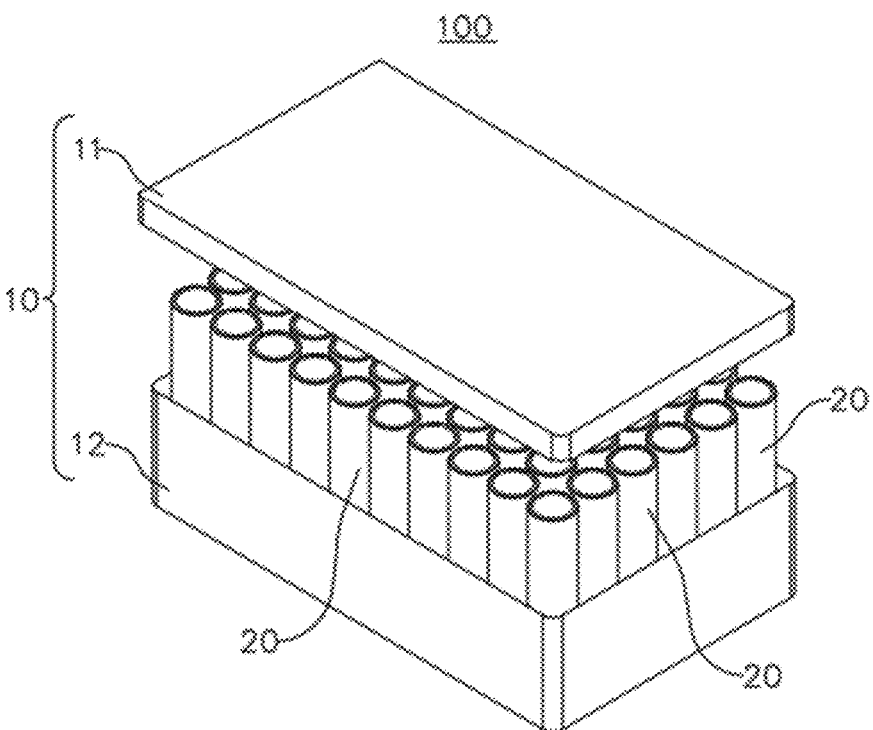
FIG. 2 is an exploded structural diagram of a battery according to some embodiments of the present application.
Figure 3:
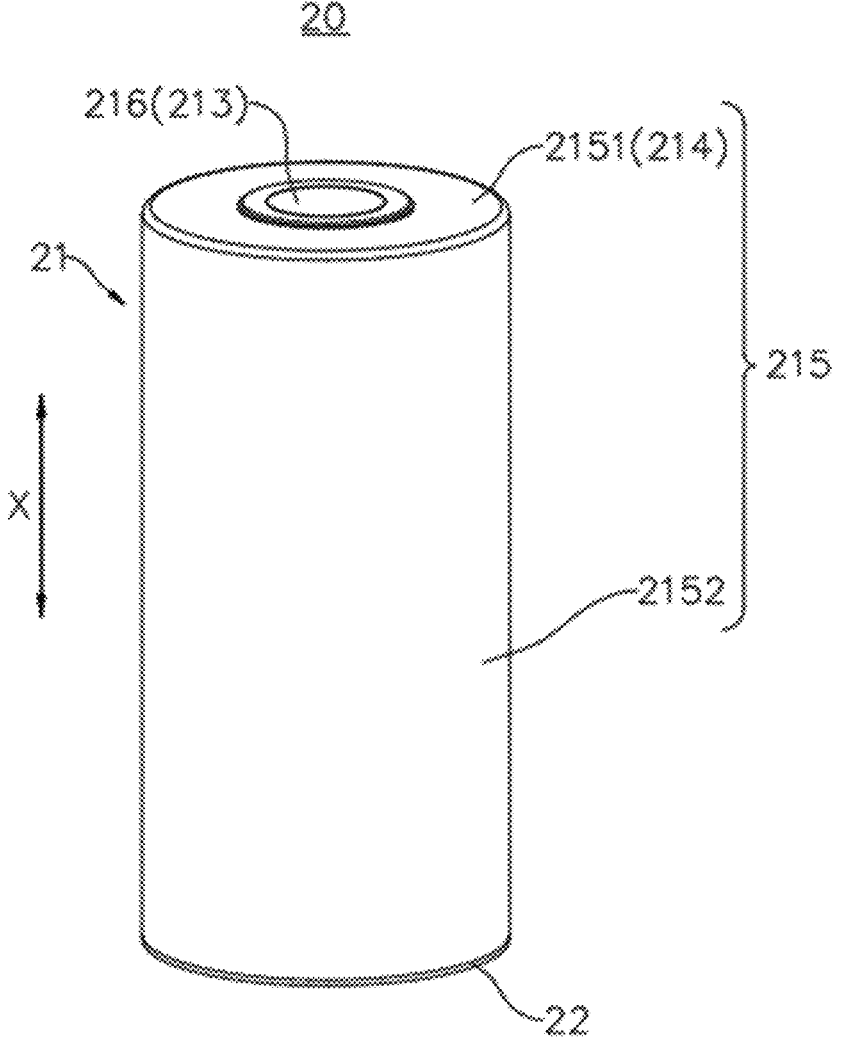
FIG. 3 is a schematic structural diagram of a battery cell according to some embodiments of the present application.

Referring to FIG. 2 and FIG. 3, FIG. 2 is an exploded structural diagram of a battery 100 according to some embodiments of the present application, and FIG. 3 is a schematic structural diagram of a battery cell 20 according to some embodiments of the present application. The battery 100 includes a box 10 and a battery cell 20. The battery cell 20 is configured to be accommodated in the box 10.

The box 10 is configured to provide an assembling space for the battery cell 20, and the box 10 may be of a variety of structures. In some embodiments, the box 10 includes a first box body 11 and a second box body 12. The first box body 11 and the second box body 12 cover each other, and the first box body 11 and the second box body 12 together define an assembling space for accommodating the battery cell 20. The second box body 12 may be of a hollow structure with one end open, the first box body 11 may be of a plate-like structure, and the first box body 11 covers the opening side of the second box body 12, so that the first box body 11 and the second box body 12 together define the assembling space. Both of the first box body 11 and the second box body 12 may also be of a hollow structure with one side open, and the opening side of the first box body 11 covers the opening side of the second box body 12.

Of course, the box 10 formed by the first box body 11 and the second box body 12 may be in a variety of shapes, such as a cylinder, a rectangular solid, a cuboid, or the like. For example, in FIG. 2, the box 10 is in a rectangular solid shape.

In the battery 100, there may be one or a plurality of battery cells 20 arranged in the box 10. If a plurality of battery cells 10 are arranged in the box 20, the plurality of battery cells 20 may be connected in series, in parallel, or in parallel-series, where the parallel-series connection means that the plurality of battery cells 20 are connected both in series and in parallel. The plurality of battery cells 20 may be directly connected in series, in parallel, or in parallel-series, and then the entirety formed by the plurality of battery cells 20 is accommodated in the box 10. Of course, in some embodiments, the battery 100 may also be an entirety formed by connecting the plurality of battery cells 20 in series, in parallel, or in parallel-series to form battery modules and then connecting the plurality of battery modules in series, in parallel, or in parallel-series, and the entirety is then accommodated in the box 10.

In some embodiments, the battery 100 may further include other structures. For example, the battery 100 may further include a busbar component, and the busbar component is configured to connect the plurality of battery cells 20 so as to realize the electrical connections between the plurality of battery cells 20.

Each of the battery cells 20 may be a secondary battery or a primary battery. The battery cell 20 may also be a lithium-sulfur battery, a sodium-ion battery, or a magnesium-ion battery, but the battery cell 20 is not limited thereto. The battery cell 20 may be in a cylindrical-shape, a prismatic-shape, another shape, or the like. For example, in FIG. 3, the battery cell 20 is of a cylindrical structure.

Figure 4:
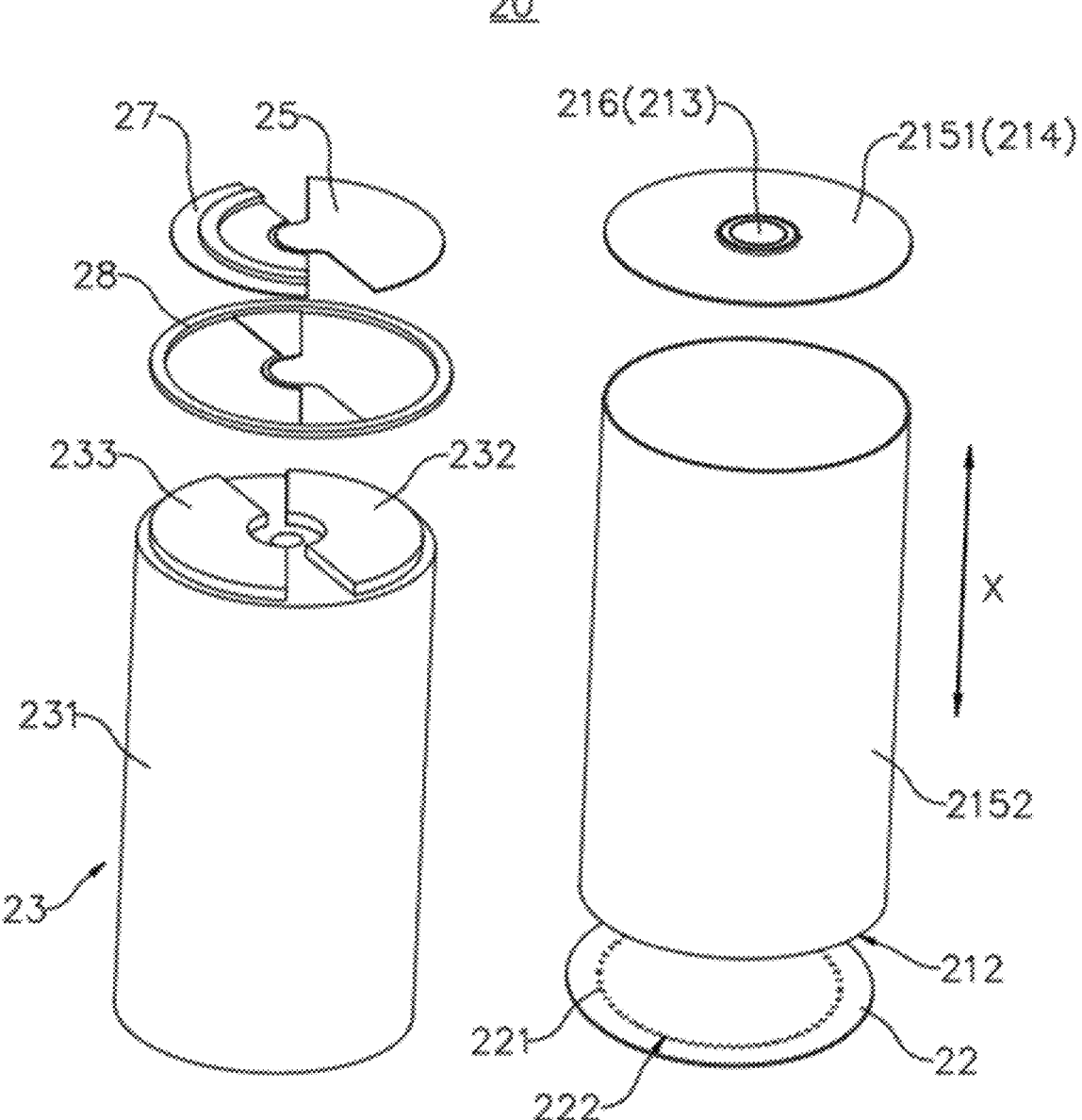
FIG. 4 is an exploded structural diagram of a battery cell according to some embodiments of the present application.
Figure 5:
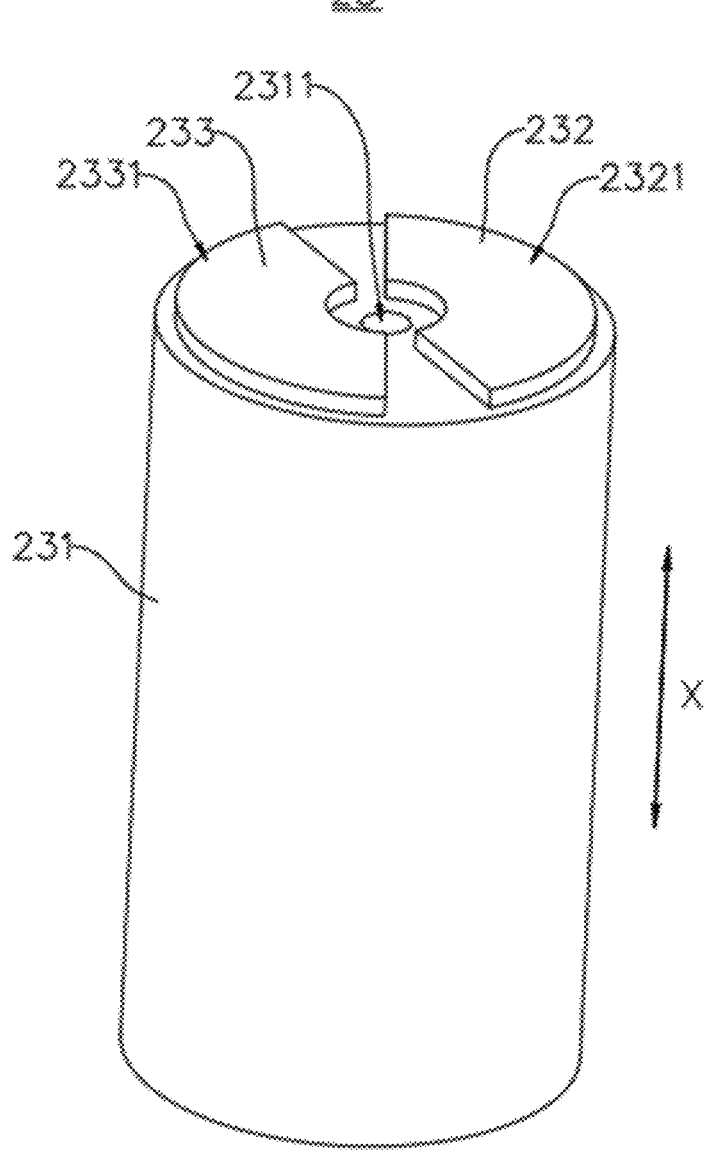
FIG. 5 is a schematic structural diagram of an electrode assembly of a battery cell according to some embodiments of the present application.
Figure 6:
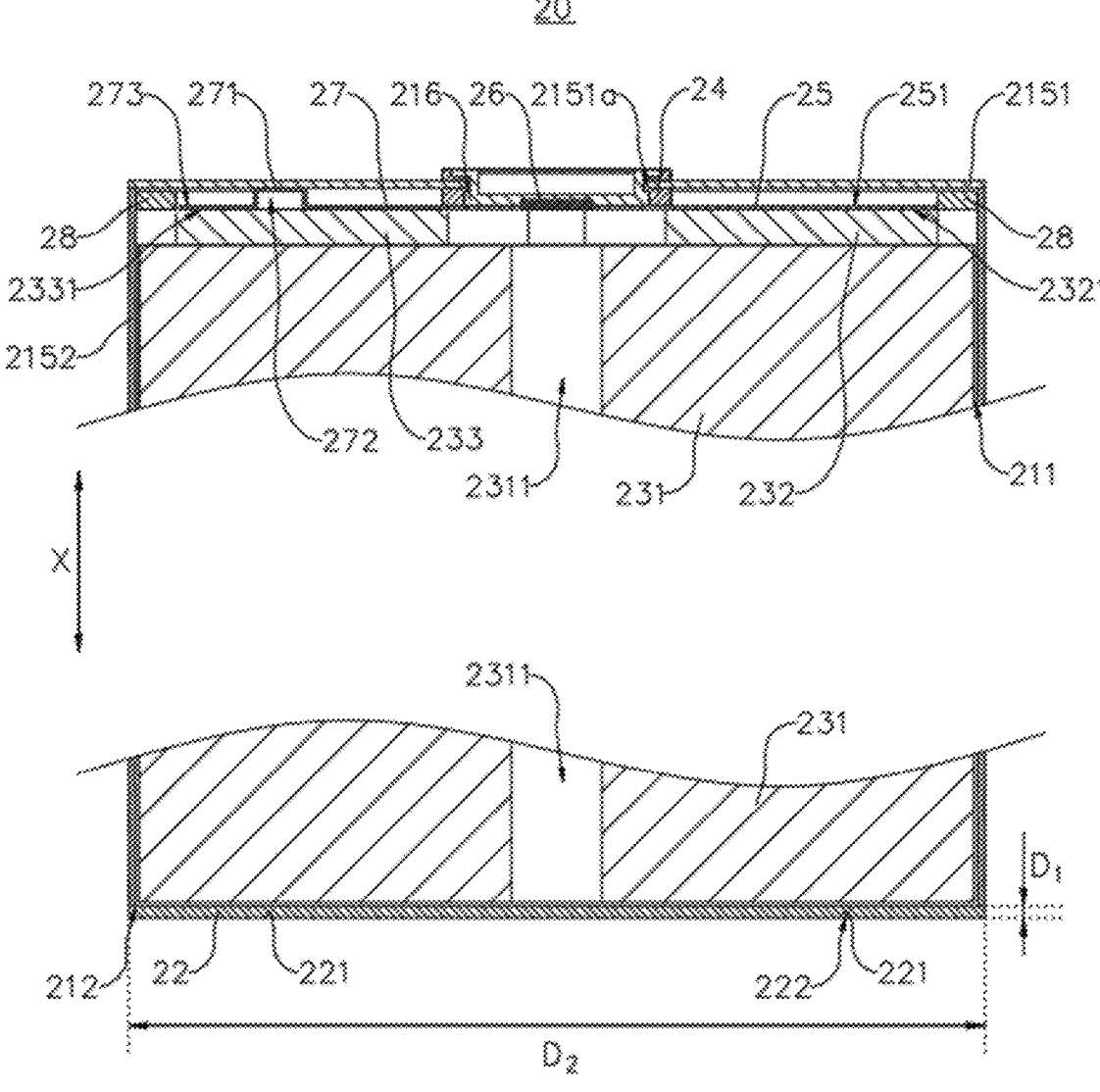
FIG. 6 is a sectional diagram of a battery cell according to some embodiments of the present application.

According to some embodiments of the present application, referring to FIG. 3, and further referring to FIG. 4, FIG. 5, and FIG. 6, FIG. 4 is an exploded structural diagram of a battery cell 20 according to some embodiments of the present application, FIG. 5 is a schematic structural diagram of an electrode assembly 23 of a battery cell 20 according to some embodiments of the present application, and FIG. 6 is a sectional diagram of a battery cell 20 according to some embodiments of the present application. The present application provides a battery cell 20, and the battery cell 20 includes a case assembly 21, an end cover 22, and an electrode assembly 23. The case assembly 21 is provided with an accommodating cavity 211 having an opening 212 formed therein. The case assembly 21 has a first electrode lead-out portion 213 and a second electrode lead-out portion 214. In a first direction X, the first electrode lead-out portion 213 and the second electrode lead-out portion 214 are both located at one end of the case assembly 21 away from the opening 212, and the end cover 22 covers the opening 212. The electrode assembly 23 is accommodated in the accommodating cavity 211, and the electrode assembly 23 includes a main body part 231, a first tab 232, and a second tab 233. The first tab 232 and the second tab 233 have opposite polarities. The first tab 232 and the second tab 233 are both arranged at one end of the main body part 231 away from the end cover 22 in the first direction X. The first tab 232 and the second tab 233 are electrically connected to the first electrode lead-out portion 213 and the second electrode lead-out portion 214, respectively. The end cover 22 is provided with a pressure relief portion 221, and the pressure relief portion 221 is configured to relieve an internal pressure of the battery cell 20.

The case assembly 21 includes a case 215, and the case 215 and the end cover 22 together form a shell of the battery cell 20. The shell may further be configured to accommodate an electrolyte, such as an electrolyte solution. The case 215 is provided with the accommodating cavity 211 therein, and the accommodating cavity 211 is configured to accommodate the electrode assembly 23. The accommodating cavity 211 has an opening 212. The end cover 22 covers the opening 212 of the case 215 and forms a sealed connection, so as to form a sealed space for accommodating the electrode assembly 23 and the electrolyte. Optionally, the case 215 and the end cover 22 may be made of various materials. For example, the materials of the case 215 and the end cover 22 may be copper, iron, aluminum, steel, aluminum alloy, or the like.

When the battery cell 20 is assembled, the electrode assembly 23 may be placed in the case 215 first, the case 215 is filled with the electrolyte solution, and then the opening 212 of the case 215 is covered by the end cover 22, so as to complete the assembling of the battery cell 20.

The case 215 of the case assembly 21 may have a variety of shapes, such as a cylindrical or prismatic structure. The shape of the case 215 may be determined according to the specific shape of the electrode assembly 23. For example, when the electrode assembly 23 is of a cylindrical structure, the case 215 of a cylindrical structure may be selected. Of course, the end cover 22 may have various structures. For example, the end cover 22 may be a plate-like structure or a hollow structure with one end open. For example, in FIG. 3 and FIG. 4, the case 215 is of a cylindrical structure, and a central axis of the case 215 extends in the first direction X.

In the first direction X, the first electrode lead-out portion 213 and the second electrode lead-out portion 214 are both located at one end of the case assembly 21 away from the opening 212. That is, the first electrode lead-out portion 213 and the second electrode lead-out portion 214 are both located at one end of the electrode assembly 23 in the first direction X, and the end cover 22 is located at the other end of the electrode assembly 23 in the first direction X, so that the end cover 22 for arranging the pressure relief portion 221 and the first electrode lead-out portion 213 and the second electrode lead-out portion 214 for electrically connecting to the first tab 232 and the second tab 233 of the electrode assembly 23 are respectively located at the two ends of the electrode assembly 23 in the first direction X.

The first electrode lead-out portion 213 and the second electrode lead-out portion 214 are configured to input or output the electric energy of the battery cell 20. The first electrode lead-out portion 213 and the second electrode lead-out portion 214 are configured to output or input the positive electrode and the negative electrode of the battery cell 20, respectively. The first electrode lead-out portion 213 and the second electrode lead-out portion 214 may be of a variety of structures. For example, in FIG. 3 and FIG. 4, the case 215 can include a first wall 2151 and a second wall 2152. In the first direction X, the first wall 2151 is arranged opposite to the end cover 22, and the second wall 2152 is arranged around the first wall 2151. One end of the second wall 2152 in the first direction X is connected to the first wall 2151, and the other end encloses to form the opening 212 for the end cover 22 to cover. Correspondingly, the case assembly 21 may further include an electrode terminal 216, and the electrode terminal 216 is mounted on the first wall 2151 in an insulated manner. That is, no electrical connection is formed between the electrode terminal 216 and the first wall 2151. The electrode terminal 216 is the first electrode lead-out portion 213 for electrically connecting to the first tab 232, and the first wall 2151 is the second electrode lead-out portion 214 for electrically connecting to the second tab 233. The first direction X is a thickness direction of the first wall 2151 and a thickness direction of the end cover 22.

It should be noted that, in some embodiments, the first electrode lead-out portion 213 may also be the first wall 2151, and correspondingly, the second electrode lead-out portion 214 is the electrode terminal 216. Of course, the structure of the battery cell 20 is not limited to this. In other embodiments, the battery cell 20 may further be of another structure. For example, two electrode terminals 216 may be mounted on the first wall 2151 in an insulated manner. The two electrode terminals 216 are arranged at an interval, that is, the two electrode terminals 216 do not contact with each other, and the two electrode terminals 216 are respectively the first electrode lead-out portion 213 and the second electrode lead-out portion 214.

The end cover 22 covers the opening 212. In other words, the end cover 22 and the case assembly 21 are separately arranged structures, and the end cover 22 is connected to the opening 212 of the case 215 of the case assembly 21. Optionally, there may be a variety of structures for the end cover 22 to be connected to the case assembly 21. For example, the end cover 22 can be connected to the opening 212 of the case 215 of the case assembly 21 by welding, bonding, or the like.

Optionally, the first wall 2151 and the second wall 2152 of the case 215 may be an integrally formed structure. In other words, the first wall 2151 and the second wall 2152 are an integral structure made by an integral forming process such as stamping or casting. The first wall 2151 and the second wall 2152 of the case 215 may also be separately arranged structures. In other words, the first wall 2151 and the second wall 2152 are separately arranged structures, and the first wall 2151 may be connected to one end of the second wall 2152 in the first direction X by welding, bonding, or the like.

For example, in FIG. 4, the first wall 2151 and the second wall 2152 of the case 215 are separately arranged structures. It should be noted that, in this embodiment, the electrode assembly 23 may be first assembled to the interior of the second wall 2152, the second wall 2152 and the first wall 2151 are connected to each other, and then the end cover 22 covers the opening 212 of the second wall 2152.

It should be noted that, the electrode assembly 23 is a component in the battery cell 20 where electrochemical reactions occur. The structure of the electrode assembly 23 may be varied. For example, the electrode assembly 23 may be a wound structure formed by winding a positive electrode plate, a spacer, and a negative electrode plate, the main body part 231 of the electrode assembly 23 is cylindrical, and the central axis of the main body part 231 extends in the first direction X.

For example, the spacer is a separator, and the main material of the separator may be selected from at least one of glass fiber, non-woven fabric, polyethylene, polypropylene, and polyvinylidene fluoride.

The main body part 231 is a region where the electrode assembly 23 undergoes chemical reactions within the battery cell 20. The main body part 231 is a structure formed by winding a region of the positive electrode plate coated with a positive electrode active material layer, the spacer, and a region of the negative electrode plate coated with a negative electrode active material layer. It mainly works relying on metal ions moving between the positive electrode plate and the negative electrode plate having opposite polarities.

The first tab 232 and the second tab 233 are both arranged at one end of the main body part 231 away from the end cover 22 in the first direction X. In other words, the first tab 232 and the second tab 233 are arranged at the same end of the main body part 231 in the first direction X and are located at one end of the main body part 231 facing the first wall 2151.

The first tab 232 and the second tab 233 are configured to output or input the positive and negative electrodes of the electrode assembly 23, respectively. If the first tab 232 is configured to input or output the positive electrode of the electrode assembly 23, the first tab 232 is a component formed by mutually stacking and connecting the regions on the positive electrode plate that are not coated with the positive electrode active material layer. Correspondingly, the second tab 233 is configured to output or input the negative electrode of the electrode assembly 23, and the second tab 233 is a component formed by mutually stacking and connecting the regions on the negative electrode plate that are not coated with the negative electrode active material layer. If the first tab 232 is configured to output or input the negative electrode of the electrode assembly 23, the first tab 232 is a component formed by mutually stacking and connecting the regions on the negative electrode plate that are not coated with the negative electrode active material layer. Correspondingly, the second tab 233 is configured to input or output the positive electrode of the electrode assembly 23, and the second tab 233 is a component formed by mutually stacking and connecting the regions on the positive electrode plate that are not coated with the positive electrode active material layer. For example, in the embodiment of the present application, the first tab 232 is configured to output or input the negative electrode of the electrode assembly 23, and the second tab 233 is configured to output or input the positive electrode of the electrode assembly 23.

A pressure relief portion 221 is arranged on the end cover 22, and the pressure relief portion 221 is configured to be capable of relieving the internal pressure of the battery cell 20. In other words, the pressure relief portion 221 is arranged on the end cover 22 of the battery cell 20, and the pressure relief portion 221 plays a role in relieving the internal pressure of the battery cell 20 when thermal runaway occurs in the battery cell 20. The pressure relief portion 221 and the end cover 22 may be an integrally formed structure or separately arranged structures.

For example, in FIG. 4 and FIG. 6, the pressure relief portion 221 and the end cover 22 are the integrally formed structure, and the pressure relief portion 221 is a region on the end cover 22 where a weak structure is formed. For example, the end cover 22 is provided with a score groove 222, and the pressure relief portion 221 is a region on the end cover 22 where the score groove 222 is provided. Of course, in other embodiments, the pressure relief portion 221 and the end cover 22 may also be separate structures, and the pressure relief portion 221 may be connected to the end cover 22 by welding or the like. Correspondingly, the pressure relief portion 221 may be a component such as an explosion-proof valve, a rupture disk, an air valve, a pressure relief valve, or a safety valve.

By arranging the first tab 232 and the second tab 233 of the electrode assembly 23 at the same end of the main body part 231 in the first direction X, it is conducive to saving space occupied by the electrode assembly 23, so as to improve energy density of the battery cell 20 having such an electrode assembly 23. The battery cell 20 includes the case assembly 21 and the end cover 22. The first electrode lead-out portion 213 and the second electrode lead-out portion 214 of the case assembly 21 for electrically connecting to the first tab 232 and the second tab 233 of the electrode assembly 23 are both arranged at one end of the case assembly 21 away from the opening 212 in the first direction X. The end cover 22 covers the opening 212 and the pressure relief portion 221 is arranged on the end cover 22, so that the pressure relief portion 221 arranged on the end cover 22 is a structure located on the side of the electrode assembly 23 away from the first tab 232 and the second tab 233, and the end cover 22 and the case assembly 21 are separately arranged structures, which is conducive to reducing the difficulty of arranging the pressure relief portion 221 on the battery cell 20, thereby reducing the difficulty of manufacturing the battery cell 20, and further being capable of effectively improving the production efficiency of the battery cell 20.

According to some embodiments of the present application, referring to FIG. 4, the pressure relief portion 221 and the end cover 22 are integrally formed, that is, the pressure relief portion 221 and the end cover 22 are an integrated structure.

The pressure relief portion 221 and the end cover 22 are integrally formed. In other words, the pressure relief portion 221 is a weak structure formed on the end cover 22 by an integral forming process such as stamping or etching. For example, the end cover 22 is provided with a score groove 222, and a region on the end cover 22 where the score groove 222 is provided is the pressure relief portion 221.

By arranging the pressure relief portion 221 and the end cover 22 as the integrally formed structure, the structural stability of the pressure relief portion 221 arranged on the end cover 22 is capable of being improved, which is conducive to reducing the risk such as falling off or connection failure of the pressure relief portion 221.

It should be noted that, in some embodiments, the battery cell 20 may also be of another structure. For example, the pressure relief portion 221 and the end cover 22 are separately arranged. In other words, the pressure relief portion 221 and the end cover 22 are two independent components, and the pressure relief portion 221 may be connected to the end cover 22 by welding or the like. By arranging the pressure relief portion 221 and the end cover 22 as separately arranged structures, the pressure relief portion 221 and the end cover 22 are independent components, which is convenient for assembling and conducive to optimizing the production rhythm. For example, the pressure relief portion 221 may be a pressure relief component such as an explosion-proof valve, a rupture disk, an air valve, a pressure relief valve, or a safety valve.

According to some embodiments of the present application, referring to FIG. 3, FIG. 4, and FIG. 6, the case assembly 21 may include the case 215 and the electrode terminal 216. The case 215 may include the first wall 2151 and the second wall 2152. The second wall 2152 is arranged around the first wall 2151. In the first direction X, one end of the second wall 2152 is connected to the first wall 2151, and the other end encloses to form the opening 212. The first wall 2151 and the second wall 2152 jointly enclose to form the accommodating cavity 211. The electrode terminal 216 is insulated and mounted on the first wall 2151. The electrode terminal 216 is the first electrode lead-out portion 213, and the first wall 2151 is the second electrode lead-out portion 214.

The second wall 2152 is arranged around the first wall 2151. In other words, the second wall 2152 is an annular structure extending in a peripheral direction of the first wall 2151, so that the second wall 2152 is a side wall surrounding an outer peripheral side of the electrode assembly 23, and therefore, the case 215 is a hollow structure with the opening 212 formed at one end in the first direction X, and the interior of the case 215 forms the accommodating cavity 211 for accommodating the electrode assembly 23.

The electrode terminal 216 is the first electrode lead-out portion 213, and the first wall 2151 is the second electrode lead-out portion 214. In other words, the electrode terminal 216 of the case assembly 21 is electrically connected to the first tab 232 of the electrode assembly 23, and the first wall 2151 of the case 215 of the case assembly 21 is electrically connected to the second tab 233 of the electrode assembly 23, so that the electrode terminal 216 and the first wall 2151 respectively output or input the positive and negative electrodes of the battery cell 20.

The electrode terminal 216 functions to input or output electric energy of the battery cell 20, and the electrode terminal may be made of various materials. For example, the material of the electrode terminal may be copper, iron, aluminum, steel, aluminum alloy, or the like.

The electrode terminal 216 is mounted on the first wall 2151 in an insulated manner. In other words, no electrical connection is formed between the electrode terminal 216 and the first wall 2151.

In some embodiments, in FIG. 6, an assembly hole 2151a is provided on the first wall 2151, and the assembly hole 2151a penetrates through both sides of the first wall 2151 in the first direction X. The electrode terminal 216 is passed through the assembly hole 2151a, and both ends of the electrode terminal 216 in the first direction X extend out of the assembly holes 2151a respectively, so that the two ends of the electrode terminal 216 in the first direction X protrude from both sides of the first wall 2151 respectively, and therefore, one end of the electrode terminal 216 facing the electrode assembly 23 in the first direction X is capable of being electrically connected to the first tab 232, and the other end is capable of being electrically connected to the busbar component of the battery 100.

The battery cell 20 may further include a second insulating member 24, and the second insulating member 24 is arranged between the first wall 2151 and the electrode terminal 216 to insulate and isolate the first wall 2151 from the electrode terminal 216, thereby mounting the electrode terminal 216 on the first wall 2151 in an insulated manner.

For example, the second insulating member 24 may be made of a variety of materials, such as rubber, plastic, or silicone.

The case assembly 21 is provided with the case 215 and the electrode terminal 216, the case 215 includes the first wall 2151 arranged opposite to the end cover 22 in the first direction X and the second wall 2152 arranged around the first wall 2151, and the electrode terminal 216 is mounted on the first wall 2151 of the case 215 in an insulated manner. By setting the electrode terminal 216 as the first electrode lead-out portion 213 electrically connected to the first tab 232, and setting the first wall 2151 as the second electrode lead-out portion 214 electrically connected to the second tab 233, the electrode terminal 216 and the first wall 2151 of the case assembly 21 are respectively used as output electrodes of the battery cell 20, so that the first electrode lead-out portion 213 and the second electrode lead-out portion 214 are both located at one end of the case assembly 21 away from the opening 212, and the structure is simple, easy to implement, and capable of reducing the difficulty of assembling the battery cell 20.

According to some embodiments of the present application, referring to FIG. 4, FIG. 5, and FIG. 6, the battery cell 20 may further include the first current collecting member 25, the first current collecting member 25 is arranged between the first wall 2151 and the electrode assembly 23, and the first current collecting member 25 connects the first tab 232 and the electrode terminal 216.

In the first direction X, the first current collecting member 25 is arranged between the first wall 2151 and the electrode assembly 23, and two sides of the first current collecting member 25 are respectively connected to the first tab 232 and the electrode terminal 216 to achieve electrical connection between the first tab 232 and the electrode terminal 216.

Optionally, the connection structure between the first current collecting member 25 and the first tab 232 may be varied, such as welding, abutment, or clamping. Likewise, the connection structure between the first current collecting member 25 and the electrode terminal 216 may also be varied, such as welding, abutment, or clamping.

The first current collecting member 25 functions to electrically connect the first tab 232 and the electrode terminal 216. The first current collecting member 25 may be made of various materials, for example, the material of the first current collecting member 25 may be copper, iron, aluminum, steel, aluminum alloy, or the like.

The first current collecting member 25 is arranged between the first wall 2151 and the electrode assembly 23, and the first current collecting member 25 connects the first tab 232 and the electrode terminal 216 to achieve electrical connection between the first tab 232 and the electrode terminal 216, which is conducive to reducing the difficulty of electrical connection between the first tab 232 and the electrode terminal 216.

According to some embodiments of the present application, referring to FIG. 4, FIG. 5, and FIG. 6, a through hole 2311 is provided on the main body part 231, and the through hole 2311 passes through both ends of the main body part 231 in the first direction X. The first current collecting member 25 is welded to the electrode terminal 216 to form a weld mark 26. At least part of a projection of the weld mark 26 is located in the through hole 2311 in the first direction X.

The through hole 2311 penetrates both ends of the main body part 231 in the first direction X. In other words, the main body part 231 of the electrode assembly 23 is provided with the through hole 2311 penetrating both ends of the main body part 231 in the first direction X.

The first current collecting member 25 is welded to the electrode terminal 216 to form the weld mark 26. In other words, the first current collecting member 25 and the electrode terminal 216 are structures welded to each other, and the weld mark 26 is formed in a region where they are welded to each other.

In the first direction X, at least part of the projection of the weld mark 26 is located in the through hole 2311. That is, the first current collecting member 25 and the electrode terminal 216 have regions mutually overlapped and welded in the first direction X, and at least part of a projection of the mutually welded regions in the first direction X is located in the through hole 2311. In other words, in the first direction X, the mutually welded regions of the first current collecting member 25 and the electrode terminal 216 are arranged corresponding to the through hole 2311, so that a welding device is capable of extending into the through hole 2311 from one end of the through hole 2311 close to the end cover 22 in the first direction X, and then welding the first current collecting member 25 and the electrode terminal 216 from one side of the first current collecting member 25 away from the electrode terminal 216, thereby eliminating the need to set the electrode terminal 216 as a hollow structure or a partially thinned structure, and being capable of effectively increasing the thickness of the electrode terminal 216. For example, in FIG. 6, the electrode terminal is a hollow structure. Of course, in other embodiments, the electrode terminal 216 may also be a solid structure.

It should be noted that the projection of the weld mark 26 formed by welding the first current collecting member 25 and the electrode terminal 216 in the first direction X may be entirely located in the through hole 2311, or only partially located in the through hole 2311. For example, in FIG. 6, the projection of the weld mark 26 formed by welding the first current collecting member 25 and the electrode terminal 216 in the first direction X is entirely located in the through hole 2311.

By arranging the through hole 2311 penetrating through both ends of the main body part 231 in the first direction X on the main body part 231, and arranging at least part of the projection of the weld mark 26 formed by the mutual welding connection between the first current collecting member 25 and the electrode terminal 216 in the first direction X to be located in the through hole 2311, the projection of the region where the first current collecting member 25 and the electrode terminal 216 overlap and are welded to each other in the first direction X is capable of being located in the through hole 2311, so that when the first current collecting member 25 and the electrode terminal 216 are welded, the first current collecting member 25 and the electrode terminal 216 are capable of being welded together through the through hole 2311 from the opening 212 of the case 215, thereby eliminating the need to perform penetration welding on the electrode terminal 216 and the first current collecting member 25 from one side of the first wall 2151 of the case 215 away from the electrode assembly 23, which is conducive to reducing the welding difficulty and the power required for welding between the first current collecting member 25 and the electrode terminal 216. There is no need to reduce the thickness of the electrode terminal 216 or locally thin the electrode terminal 216 or set the electrode terminal 216 to a hollow structure in order to weld the first current collecting member 25 and the electrode terminal 216 from the side of the first wall 2151 of the case 215 away from the electrode assembly 23, which is conducive to improving the structural strength of the electrode terminal 216 and reducing the difficulty of processing the electrode terminal 216, thereby reducing the difficulty of manufacturing the battery cell 20 and improving the production efficiency of the battery cell 20.

In some embodiments, referring to FIG. 5 and FIG. 6, the electrode assembly 23 is a wound electrode assembly 23, and the through hole 2311 is a center hole of the main body part 231.

The through hole 2311 is the center hole of the main body part 231. In other words, the through hole 2311 is a central channel formed by winding the positive electrode plate, the negative plate, and the spacer of the main body part 231.

By setting the electrode assembly 23 as the electrode assembly 23 of a wound structure, and making the center hole of the main body part 231 of the electrode assembly 23 after winding to be the through hole 2311, there is no need to set a through hole 2311 separately on the main body part 231 of the electrode assembly 23, which is conducive to reducing the difficulty of manufacturing the battery cell 20 and conducive to optimizing the production rhythm of the battery cell 20.

According to some embodiments of the present application, referring to FIG. 4, FIG. 5, and FIG. 6, the battery cell 20 may further include the second current collecting member 27, the second current collecting member 27 is arranged between the first wall 2151 and the electrode assembly 23, the second current collecting member 27 and the first current collecting member 25 are arranged at an interval, and the second current collecting member 27 connects the second tab 233 and the first wall 2151.

In the first direction X, the second current collecting member 27 is arranged between the first wall 2151 and the electrode assembly 23, and two sides of the second current collecting member 27 are respectively connected to the second tab 233 and the first wall 2151 to achieve electrical connection between the second tab 233 and the first wall 2151.

Optionally, the connection structure between the second current collecting member 27 and the second tab 233 may be varied, such as welding, abutment, or clamping. Likewise, the connection structure between the second current collecting member 27 and the first wall 2151 may also be varied, such as welding, abutment, or clamping.

The second current collecting member 27 functions to electrically connect the second tab 233 and the first wall 2151. The second current collecting member 27 may be made of various materials, for example, the material of the second current collecting member 27 may be copper, iron, aluminum, steel, aluminum alloy, or the like.

The second current collecting member 27 is arranged between the first wall 2151 and the electrode assembly 23, and the second current collecting member 27 connects the second tab 233 and the first wall 2151 to achieve electrical connection between the second tab 233 and the first wall 2151, which is conducive to reducing the difficulty of mutual electrical connection between the second tab 233 and the first wall 2151. In addition, by arranging the first current collecting member 25 and the second current collecting member 27 at an interval, a short circuit phenomenon between the first current collecting member 25 and the second current collecting member 27 can be reduced, which is conducive to reducing the risk during use of the battery cell 20.

Figure 7:
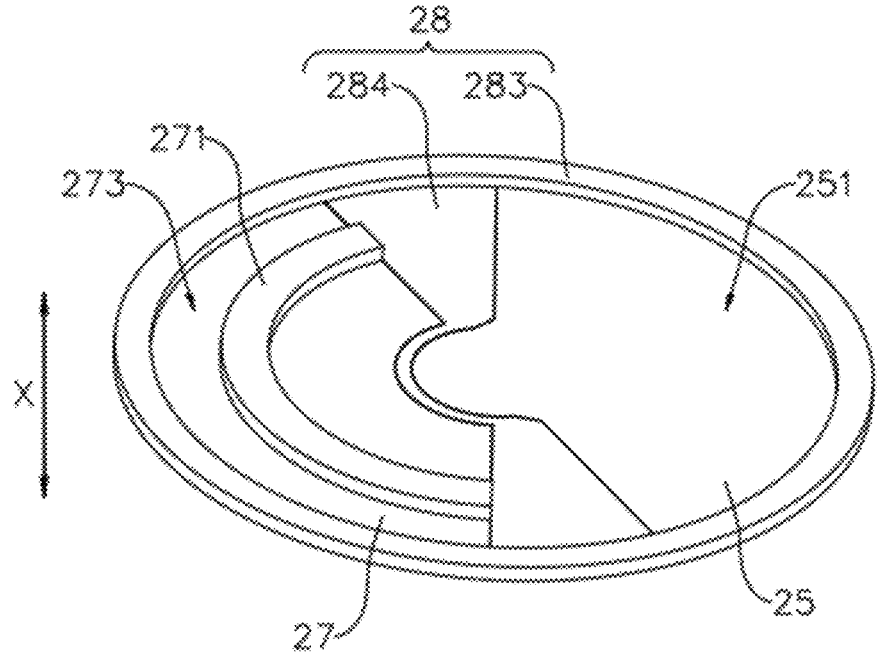
FIG. 7 is a schematic connection diagram of a first current collecting member and a second current collecting member assembled on a first insulating member in a battery cell according to some embodiments of the present application.
Figure 8:
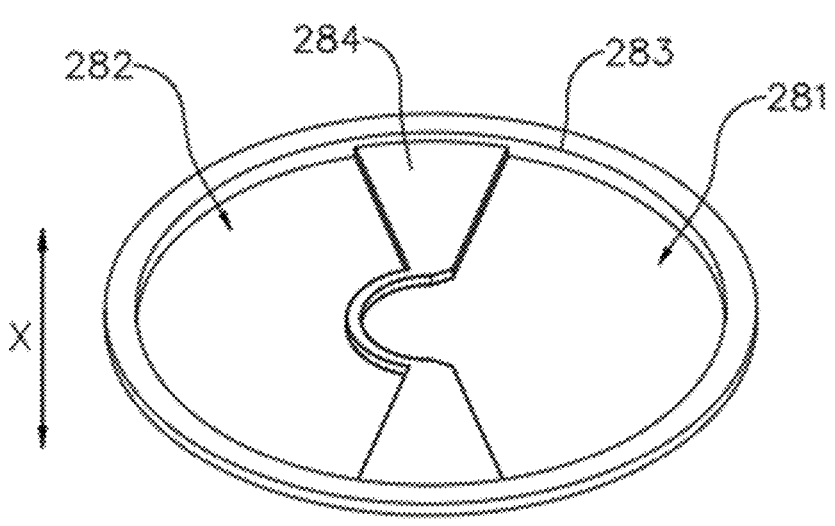
FIG. 8 is a schematic structural diagram of a first insulating member of a battery cell according to some embodiments of the present application.

According to some embodiments of the present application, referring to FIG. 4 and FIG. 6, and further referring to FIG. 7 and FIG. 8, FIG. 7 is a schematic connection diagram of a first current collecting member 25 and a second current collecting member 27 assembled on a first insulating member 28 in a battery cell 20 according to some embodiments of the present application, and FIG. 8 is a schematic structural diagram of a first insulating member 28 of a battery cell 20 according to some embodiments of the present application. The battery cell 20 may further include the first insulating member 28. The first insulating member 28 is arranged between the electrode assembly 23 and the first wall 2151. The first insulating member 28 insulates and isolates the first current collecting member 25 from the second current collecting member 27.

The first insulating member 28 provides insulation and isolation functions for the first current collecting member 25 and the second current collecting member 27. The first insulating member 28 may be made of rubber, silicone, plastic, or the like.

The first insulating member 28 insulates and isolates the first current collecting member 25 from the second current collecting member 27. In other words, at least part of the first insulating member 28 is located between the first current collecting member 25 and the second current collecting member 27 so that the first current collecting member 25 and the second current collecting member 27 do not contact with each other. That is, the first insulating member 28 is capable of separating the first current collecting member 25 and the second current collecting member 27.

The first insulating member 28 is arranged between the electrode assembly 23 and the first wall 2151, and the first insulating member 28 is configured to insulate and isolate the first current collecting member 25 from the second current collecting member 27, thereby achieving insulation and isolation between the first current collecting member 25 and the second current collecting member 27, which is conducive to further reducing the risk of short circuit between the first current collecting member 25 and the second current collecting member 27.

In some embodiments, still referring to FIG. 6, FIG. 7, and FIG. 8, the first insulating member 28 is provided with a first mounting hole 281 and a second mounting hole 282 arranged at an interval, the first current collecting member 25 is arranged in the first mounting hole 281, and the second current collecting member 27 is arranged in the second mounting hole 282.

The first insulating member 28 is provided with the first mounting hole 281 and the second mounting hole 282 arranged at an interval. In other words, the first mounting hole 281 and the second mounting hole 282 arranged on the first insulating member 28 do not contact with each other, so that the first insulating member 28 is further capable of providing an assembling function for the first current collecting member 25 and the second current collecting member 27. As shown in FIG. 8, the first mounting hole 281 and the second mounting hole 282 are structures that penetrate both sides of the first insulating member 28 in the first direction X.

For example, the first current collecting member 25 is clamped into the first mounting hole 281. Of course, in other embodiments, the first current collecting member 25 can also be connected to the first mounting hole 281 by bonding or bolting. Similarly, the second current collecting member 27 is clamped into the second mounting hole 282. Of course, in other embodiments, the second current collecting member 27 can also be connected to the second mounting hole 282 by bonding or bolting.

The first mounting hole 281 and the second mounting hole 282 are arranged at an interval on the first insulating member 28, and the first current collecting member 25 and the second current collecting member 27 are respectively arranged in the first mounting hole 281 and the second mounting hole 282, on the one hand, the first current collecting member 25 and the second current collecting member 27 are capable of being assembled to the first insulating member 28, so that the first insulating member 28 is capable of supporting and assembling the first current collecting member 25 and the second current collecting member 27, which is conducive to reducing the difficulty of arranging the first current collecting member 25 and the second current collecting member 27 between the first wall 2151 and the electrode assembly 23. On the other hand, the first current collecting member 25 and the second current collecting member 27 are capable of being arranged at an interval on the first insulating member 28 to achieve insulation and isolation between the first current collecting member 25 and the second current collecting member 27, thereby being capable of effectively reducing the risk of short circuit between the first current collecting member 25 and the second current collecting member 27.

In some embodiments, referring to FIG. 7 and FIG. 8, the first insulating member 28 may include a first insulator 283 and a second insulator 284. The first insulator 283 is of an annular structure. The second insulator 284 is connected to the first insulator 283. The second insulator 284 is configured to separate the inner space of the first insulator 283 into the first mounting hole 281 and the second mounting hole 282. The second insulator 284 is located between the first current collecting member 25 and the second current collecting member 27.

The first insulator 283 is of the annular structure. In other words, the first insulator 283 is a ring structure connected end to end, and the shape of the first insulator 283 may be varied. For example, referring to FIG. 7 and FIG. 8, the first insulator 283 is of a circular ring structure, and the first insulator 283 surrounds outer sides of the first current collecting member 25 and the second current collecting member 27. In other words, the first insulator 283 is an annular structure, and the first current collecting member 25 and the second current collecting member 27 are both located on an inner side of the first insulator 283.

The second insulator 284 is connected to the first insulator 283, and the second insulator 284 is configured to separate the internal space of the first insulator 283 into the first mounting hole 281 and the second mounting hole 282. The second insulator 284 is located between the first current collecting member 25 and the second current collecting member 27. In other words, the second insulator 284 is located on the inner side of the first insulator 283, and both ends of the second insulator 284 are connected to an inner circumferential surface of the first insulator 283 to separate the internal space of the first insulator 283 into two assembling spaces, namely the first mounting hole 281 and the second mounting hole 282.

Optionally, the first insulator 283 and the second insulator 284 may be an integrally formed structure or separately arranged structures. For example, in FIG. 8, the first insulator 283 and the second insulator 284 are the integrally formed structure, and the first insulator 283 and the second insulator 284 can be manufactured by an integral forming process such as injection molding, stamping, or extrusion molding.

The first insulating member 28 is provided with the first insulator 283 of an annular structure and the second insulator 284 connected to the inner side of the first insulator 283, and the second insulator 284 is configured to separate the internal space of the first insulator 283 into the first mounting hole 281 and the second mounting hole 282, so that the first insulator 283 and the second insulator 284 jointly define the first mounting hole 281 and the second mounting hole 282 for assembling the first current collecting member 25 and the second current collecting member 27. The first insulating member 28 with such a structure is capable of, on the one hand, surrounding around the outer sides of the first current collecting member 25 and the second current collecting member 27 by the first insulator 283, so that the first current collecting member 25 and the second current collecting member 27 are capable of being separated from the second wall 2152 of the case 215, which is conducive to reducing the risk of short circuit between the first current collecting member 25 and the second current collecting member 27 and the second wall 2152 of the case 215. On the other hand, the first current collecting member 25 and the second current collecting member 27 are capable of being separated by the second insulator 284, which is conducive to reducing the risk of short circuit between the first current collecting member 25 and the second current collecting member 27.

According to some embodiments of the present application, referring to FIG. 4, FIG. 6, and FIG. 7, in the first direction X, a protrusion 271 is arranged to protrude from one side of the second current collecting member 27 facing the first wall 2151, and the protrusion 271 is connected to the first wall 2151.

The electrode terminal 216 protrudes from the side of the first wall 2151 facing the electrode assembly 23 in the first direction X, so that there is a distance between a surface of the first wall 2151 configured to be connected to the second current collecting member 27 and an end surface of the electrode terminal 216 configured to be connected to the first current collecting member 25 in the first direction X, so that a distance difference between the first wall 2151 and the electrode terminal 216 is capable of being compensated by a structure of arranging the protrusion 271 to protrude from the side of the second current collecting member 27 facing the first wall 2151 and connecting the protrusion 271 to the first wall 2151.

The protrusion 271 is arranged to protrude from the side of the second current collecting member 27 facing the first wall 2151 so that the second current collecting member 27 is connected to the first wall 2151 through the protrusion 271, which is conducive to reducing the assembling difficulty between the first wall 2151 and the second current collecting member 27, and is capable of improving a contact effect between the second current collecting member 27 and the first wall 2151.

It should be noted that, in other embodiments, the protrusion 271 may not be provided on the second current collecting member 27. It is only necessary to make the overall thickness of the second current collecting member 27 in the first direction X thicker to compensate for the distance difference between the first wall 2151 and the electrode terminal 216. Alternatively, a connecting block may be arranged to protrude from the side of the first wall 2151 facing the second current collecting member 27 to compensate for the distance difference between the first wall 2151 and the electrode terminal 216 by the connecting block. Alternatively, the first tab 232 and the second tab 233 may be provided as structures with different heights in the first direction X, that is, a dimension of the first tab 232 protruding from one end of the main body part 231 is smaller than a dimension of the second tab 233 protruding from the end of the main body part 231 in the first direction X, so that the second tab 233 is a structure closer to the first wall 2151 than the first tab 232 in the first direction X, and therefore, the distance difference between the first wall 2151 and the electrode terminal 216 is compensated by the first tab 232 and the second tab 233 with different heights.

In some embodiments, in the first direction X, a groove 272 is formed in a region on one side of the second current collecting member 27 away from the first wall 2151 and corresponding to the protrusion 271.

For example, the protrusion 271 arranged on one side of the second current collecting member 27 is a structure formed by a stamping process, so as to form the protrusion 271 on the side of the second current collecting member 27, and the groove 272 is formed on the side of the second current collecting member 27 away from the protrusion 271 and at the position corresponding to the protrusion 271. Of course, the processing method of the protrusion 271 arranged on the side of the second current collecting member 27 is not limited thereto. In other embodiments, the protrusion 271 arranged on the side of the second current collecting member 27 may also be formed by processing techniques such as laser etching, engraving, or casting.

It should be noted that, in other embodiments, the protrusion 271 and the second current collecting member 27 may also be separately arranged structures. In other words, the protrusion 271 and the second current collecting member 27 are two independent components, and the protrusion 271 is connected to the surface of the second current collecting member 27 facing the first wall 2151 by a structure such as welding or bonding.

By forming the groove 272 in the region of the second current collecting member 27 on the side away from the protrusion 271 and corresponding to the protrusion 271, the protrusion 271 of the second current collecting member 27 may be a concave-convex structure that can be formed by stamping, and therefore, it is capable of forming the protrusion 271 and the groove 272 on two sides of the second current collecting member 27, respectively. The current collecting member with such a structure is easy to manufacture and it is conducive to reducing the difficulty in processing the protrusion 271, thereby improving the processing efficiency of arranging the protrusion 271 on the second current collecting member 27.

According to some embodiments of the present application, referring to FIG. 6 and FIG. 7, in the first direction X, the first current collecting member 25 has a first surface 251 facing the first wall 2151, the electrode terminal 216 is connected to the first surface 251, the second current collecting member 27 has a second surface 273 facing the first wall 2151, and the protrusion 271 is arranged on the second surface 273. The first surface 251 is flush with the second surface 273.

The electrode terminal 216 protrudes from the side of the first wall 2151 facing the electrode assembly 23, and the first surface 251 of the first current collecting member 25 configured to be connected to the electrode terminal 216 and the second surface 273 of the second current collecting member 27 facing the first wall 2151 are flush with each other; therefore, after the first surface 251 of the first current collecting member 25 is connected to the electrode terminal 216, there is a gap between the second surface 273 and the first wall 2151, so that by arranging the protrusion 271 to protrude from the second surface 273 and connecting it to the first wall 2151, the gap between the second surface 273 and the first wall 2151 is capable of being effectively compensated.

For example, the dimension of the protrusion 271 protruding from the second surface 273 in the first direction X is equal to the dimension of the electrode terminal 216 protruding from the side of the first wall 2151 facing the electrode assembly 23.

Of course, in other embodiments, the battery cell 20 may also be of another structure. For example, in the first direction X, the first surface 251 is closer to the first wall 2151 than the second surface 273. In this embodiment, the dimension of the protrusion 271 protruding from the second surface 273 in the first direction X is equal to a distance between the second surface 273 and the first wall 2151.

By setting the first surface 251 of the first current collecting member 25 to be a structure flush with the second surface 273 of the second current collecting member 27 or closer to the first wall 2151 than the second surface 273 of the second current collecting member 27, the protrusion 271 arranged on the second surface 273 of the second current collecting member 27 is capable of compensating for the gap between the second surface 273 and the first wall 2151, so that the second current collecting member 27 is capable of being connected to the first wall 2151 and the contact effect between the second current collecting member 27 and the first wall 2151 is capable of being improved.

In some embodiments, referring to FIG. 5 and FIG. 6, in the first direction X, the first tab 232 has a third surface 2321 facing the first wall 2151, the first current collecting member 25 being connected to the third surface 2321, and the second tab 233 has a fourth surface 2331 facing the first wall 2151, the second current collecting member 27 being connected to the fourth surface 2331. The third surface 2321 is flush with the fourth surface 2331.

The third surface 2321 of the first tab 232 is flush with the fourth surface 2331 of the second tab 233, so that the first tab 232 and the second tab 233 are structures protruding from one end of the main body part 231 facing the first wall 2151 and having the same height. In the embodiment where the first surface 251 of the first current collecting member 25 and the second surface 273 of the second current collecting member 27 are flush with each other, the first current collecting member 25 and the second current collecting member 27 are capable of being structures having the same thickness, which is conducive to optimizing the internal space utilization of the battery cell 20.

By setting the third surface 2321 of the first tab 232 facing the first wall 2151 and the fourth surface 2331 of the second tab 233 facing the first wall 2151 to be structures flush with each other, on the one hand, it is convenient to process the first tab 232 and the second tab 233, and on the other hand, it is capable of achieving that the first current collecting member 25 and the second current collecting member 27 are structures flush with each other on the side facing the electrode assembly 23 in the first direction X, so as to reduce a position difference between the first current collecting member 25 and the second current collecting member 27 in the first direction X, thereby being conducive to reducing the difficulty of assembling the first current collecting member 25 and the second current collecting member 27 between the electrode assembly 23 and the first wall 2151, and improving the internal space utilization of the battery cell 20.

According to some embodiments of the present application, referring to FIG. 4, the first wall 2151 and the second wall 2152 are separately arranged, that is, the first wall 2151 and the second wall 2152 are separate structures.

The first wall 2151 and the second wall 2152 are separately arranged. In other words, the first wall 2151 and the second wall 2152 of the case 215 are two independent components. In the first direction X, the first wall 2151 is connected to one end of the second wall 2152 away from the opening 212. For example, the connection structure between the first wall 2151 and the second wall 2152 can be varied, such as welding, bonding, or clamping.

By arranging the first wall 2151 and the second wall 2152 as separately arranged structures, it is conducive to reducing the difficulty of assembling the electrode terminal 216 on the first wall 2151, and conducive to reducing the difficulty of assembling between the electrode terminal 216 and the first tab 232 and between the first wall 2151 and the second tab 233, thereby being conducive to reducing the difficulty of manufacturing the battery cell 20 to improve the production efficiency of the battery cell 20.

It should be noted that the structure of the battery cell 20 is not limited thereto. In some embodiments, the battery cell 20 may also be of another structure, for example, the first wall 2151 and the second wall 2152 are integrally formed.

In other words, the first wall 2151 and the second wall 2152 are an integrated structure, and the first wall 2151 and the second wall 2152 are made by an integral molding process such as stamping, casting, or extrusion molding. By arranging the first wall 2151 and the second wall 2152 as an integrated structure, on the one hand, the connection stability and reliability between the first wall 2151 and the second wall 2152 are capable of being improved, which is conducive to improving the overall structural strength of the case 215. On the other hand, an influence caused by a stress generated by the mutual assembling connection between the first wall 2151 and the second wall 2152 on components such as the electrode terminal 216 is capable of being reduced.

According to some embodiments of the present application, referring to FIG. 6, in the first direction X, a thickness of the end cover 22 is $D_1$, meeting 0.3 mm$\leq D_1 \leq$3.5 mm.

The end cover 22 is a circular plate-shaped structure, and the thickness direction of the end cover 22 is the same as the first direction X. The thickness $D_1$ of the end cover 22 is the dimension of the end cover 22 in the first direction X.

For example, the thickness $D_1$ of the end cover 22 may be 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, 2 mm, 2.2 mm, 2.5 mm, 3 mm, 3.5 mm, or the like.

By setting the thickness of the end cover 22 in the first direction X to be greater than or equal to 0.3 mm, the end cover 22 has sufficient structural strength, which is conducive to reducing the risk of deformation of or damage to the end cover 22 during use or assembling, and the end cover 22 has sufficient space to arrange the pressure relief portion 221 on the end cover 22, which is conducive to reducing the difficulty of arranging the pressure relief portion 221 on the end cover 22. In addition, by setting the thickness of the end cover 22 in the first direction X to be less than or equal to 3.5 mm, the space occupied by the end cover 22 in the first direction X is saved, which is conducive to improving the energy density of the battery cell 20.

According to some embodiments of the present application, referring to FIG. 3 and FIG. 6, the battery cell 20 is cylindrical, and the central axis of the battery cell 20 extends in the first direction X.

The battery cell 20 is cylindrical, and correspondingly, the case 215 of the case assembly 21 is cylindrical, and the end cover 22 is a circular plate-shaped structure.

The battery cell 20 is set to be cylindrical so as to facilitate processing to form the battery cell 20 with a cylindrical structure, so that the battery cell 20 has advantages such as high capacity, long cycle life, and a wide range of ambient temperature.

In some embodiments, referring to FIG. 6, a diameter of the battery cell 20 is $D_2$, meeting 27 mm$\leq D_2 \leq$100 mm.

For example, the diameter $D_2$ of the battery cell 20 may be 27 mm, 30 mm, 32 mm, 35 mm, 38 mm, 40 mm, 42 mm, 45 mm, 48 mm, 50 mm, 55 mm, 60 mm, 65 mm, 70 mm, 75 mm, 80 mm, 85 mm, 90 mm, 95 mm, 100 mm, or the like.

Preferably, the diameter of the battery cell 20 is $D_2$, meeting 30 mm$\leq D_2 \leq$70 mm.

By setting the diameter of the battery cell 20 to be greater than or equal to 27 mm, there is enough space inside the battery cell 20 to accommodate the electrode assembly 23, which is conducive to reducing an interference phenomenon between the first tab 232 and the second tab 233 located at the same end of the main body part 231 of the electrode assembly 23. In addition, by setting the diameter of the battery cell 20 to be less than or equal to 100 mm, a phenomenon of an excessively large number of electrode plate layers in the electrode assembly 23 caused by the excessively large internal space of the battery cell 20 can be alleviated, which is conducive to reducing a phenomenon of stress accumulation caused by the excessively large number of the electrode plate layers in the electrode assembly 23.

According to some embodiments of the present application, a battery 100 is further provided in the present application, and the battery 100 includes the battery cell 20 according to any of the above solutions.

As shown in FIG. 2, the battery 100 may further include a box 10, and the battery cell 20 is accommodated in the box 10.

In some embodiments, the box 10 includes a first box body 11 and a second box body 12. The first box body 11 and the second box body 12 cover each other, and the first box body 11 and the second box body 12 together define an assembling space for accommodating the battery cell 20.

Optionally, the second box body 12 may be of a hollow structure with one end open, the first box body 11 may be of a plate-like structure, and the first box body 11 covers the opening side of the second box body 12, so that the first box body 11 and the second box body 12 together define the assembling space. Both of the first box body 11 and the second box body 12 may also be of a hollow structure with one side open, and the opening side of the first box body 11 covers the opening side of the second box body 12.

Of course, the box 10 formed by the first box body 11 and the second box body 12 may be in a variety of shapes, such as a cylinder, a rectangular solid, or the like. For example, in FIG. 2, the box 10 is of a rectangular solid structure.

Optionally, there may be one or a plurality of battery cells 20 arranged in the box 10. For example, in FIG. 2, there may be a plurality of battery cells 20 arranged in the box 10 of the battery 100, and the plurality of battery cells 20 may be connected in series, in parallel, or in parallel-series, and the parallel-series connection means that the plurality of battery cells 20 are connected in both series and parallel. The plurality of battery cells 20 may be directly connected in series, in parallel, or in parallel-series, and then the entirety formed by the plurality of battery cells 20 is accommodated in the box 10. Of course, the battery 100 may also be an entirety formed by connecting the plurality of battery cells 20 in series, in parallel, or in parallel-series to form battery modules and then connecting the plurality of battery modules in series, in parallel, or in parallel-series, and the entirety is then accommodated in the box 10.

The battery 100 may further include other structures. For example, the battery 100 may further include a busbar component, and the busbar component connects the plurality of battery cells 20 so as to realize the electrical connections between the plurality of battery cells 20.

It should be noted that, in some embodiments, the battery 100 may not be provided with a box 10. The battery 100 includes a plurality of battery cells 20, and the battery 100 composed of the plurality of battery cells 20 may be directly assembled on an electrical apparatus to provide electrical energy to the electrical apparatus through the plurality of battery cells 20. In other words, the box 10 may be used as a part of an electrical apparatus. The electrical apparatus is, for example, a vehicle 1000, and the box 10 may be used as a part of a chassis structure of the vehicle 1000. For example, a part of the box 10 may become at least a part of a floor of the vehicle 1000, or a part of the box 10 may be at least a part of a cross beam and a longitudinal beam of the vehicle 1000.

According to some embodiments of the present application, an electrical apparatus is further provided in the present application, and the electrical apparatus includes the battery cell 20 according to any of the above solutions, and the battery cell 20 is configured to provide electric energy for the electrical apparatus.

The electrical apparatus may be any of the above-mentioned devices or systems applying the battery cell 20.

According to some embodiments of the present application, referring to FIG. 3 to FIG. 8, the present application provides a battery cell 20. The battery cell 20 is cylindrical. The battery cell 20 includes the case assembly 21, the end cover 22, the electrode assembly 23, the first current collecting member 25, the second current collecting member 27, the first insulating member 28, and the second insulating member 24. The case assembly 21 includes the case 215 and the electrode terminal 216. The case 215 is cylindrical, and the case 215 includes the first wall 2151 and the second wall 2152 that are separately arranged. The second wall 2152 is arranged around the first wall 2151. In the first direction X, one end of the second wall 2152 is connected to the first wall 2151, and the other end encloses to form the opening 212. The first wall 2151 and the second wall 2152 jointly enclose to form an accommodating cavity 211. The electrode terminal 216 is mounted on the first wall 2151 in an insulated manner. The assembly hole 2151a is provided on the first wall 2151, and the assembly hole 2151a penetrates through both sides of the first wall 2151 in the first direction X. The electrode terminal 216 is passed through the assembly hole 2151a, and both ends of the electrode terminal 216 in the first direction X extend out of the assembly holes 2151a respectively, so that two ends of the electrode terminal 216 in the first direction X protrude from two sides of the first wall 2151, respectively, the second insulating member 24 is arranged between the first wall 2151 and the electrode terminal 216 to insulate and isolate the first wall 2151 from the electrode terminal 216. The end cover 22 covers the opening 212. The end cover 22 is provided with the pressure relief portion 221, the pressure relief portion 221 is configured to be capable of relieving an internal pressure of the battery cell 20, and the pressure relief portion 221 and the end cover 22 are integrally formed. The electrode assembly 23 is accommodated in the accommodating cavity 211, and the electrode assembly 23 includes the main body part 231, the first tab 232, and the second tab 233. The main body part 231 is cylindrical. The first tab 232 and the second tab 233 have opposite polarities. The first tab 232 and the second tab 233 are both arranged at one end of the main body part 231 away from the end cover 22 in the first direction X. The first tab 232 and the second tab 233 are electrically connected to the electrode terminal 216 and the first wall 2151, respectively. The first current collecting member 25 is arranged between the first wall 2151 and the electrode assembly 23, and the first current collecting member 25 connects the first tab 232 and the electrode terminal 216. The main body part 231 is provided with the through hole 2311, and the through hole 2311 passes through both ends of the main body part 231 in the first direction X. The first current collecting member 25 is welded to the electrode terminal 216 to form the weld mark 26. At least part of a projection of the weld mark 26 is located in the through hole 2311 in the first direction X. The electrode assembly 23 is the wound electrode assembly 23, and the through hole 2311 is the center hole of the main body part 231. The second current collecting member 27 is arranged between the first wall 2151 and the electrode assembly 23, and the second current collecting member 27 connects the second tab 233 and the first wall 2151. In the first direction X, the electrode terminal 216 protrudes from the side of the first wall 2151 facing the electrode assembly 23, and the protrusion 271 is arranged to protrude from the side of the second current collecting member 27 facing the first wall 2151. The groove 272 is formed in a region on the side of the second current collecting member 27 away from the first wall 2151 and corresponding to the protrusion 271, and the protrusion 271 is connected to the first wall 2151. In the first direction X, the first current collecting member 25 has the first surface 251 facing the first wall 2151, the electrode terminal 216 being connected to the first surface 251, and the second current collecting member 27 has the second surface 273 facing the first wall 2151, the protrusion 271 being arranged on the second surface 273. The first surface 251 is flush with the second surface 273. In the first direction X, the first tab 232 has the third surface 2321 facing the first wall 2151, the first current collecting member 25 being connected to the third surface 2321, and the second tab 233 has the fourth surface 2331 facing the first wall 2151, the second current collecting member 27 being connected to the fourth surface 2331. The third surface 2321 is flush with the fourth surface 2331. The first insulating member 28 is arranged between the electrode assembly 23 and the first wall 2151. The first current collecting member 25 and the second current collecting member 27 are arranged on the first insulating member 28 at an interval. The first insulating member 28 includes the first insulator 283 and the second insulator 284. The first insulator 283 surrounds outer sides of the first current collecting member 25 and the second current collecting member 27. The second insulator 284 is connected to an inner circumferential surface of the first insulator 283 and is located between the first current collecting member 25 and the second current collecting member 27. The second insulator 284 and the first insulator 283 jointly define the first mounting hole 281 and the second mounting hole 282. The first current collecting member 25 is arranged in the first mounting hole 281, and the second current collecting member 27 is arranged in the second mounting hole 282. In the first direction X, the thickness of the end cover 22 is $D_1$, meeting 0.3 mm$\leq D_1 \leq$3.5 mm, and the diameter of the battery cell 20 is $D_2$, meeting 27 mm$\leq D_2 \leq$100 mm.

It should be noted that, without conflict, embodiments in the present application and features in the embodiments may be combined together.

The above are only preferred examples of the present application, and are not intended to limit the present application. For those skilled in the art, the present application may have various modifications and changes. Any modification, equivalent replacement, improvement, etc. made within the spirit and principle of the present application shall fall within the scope of protection of the present application.

What is claimed is:

1. A battery cell, comprising:
a case assembly provided with an accommodating cavity having an opening formed therein, wherein the case assembly has a first electrode lead-out portion and a second electrode lead-out portion, in a first direction, the first electrode lead-out portion and the second electrode lead-out portion are both located at one end of the case assembly away from the opening, the case assembly comprises a case and an electrode terminal, the case comprises a first wall and a second wall, the second wall is arranged around the first wall, and in the first direction, one end of the second wall is connected to the first wall, and the other end encloses to form the opening, the first wall and the second wall jointly enclose to form the accommodating cavity, the electrode terminal is mounted on the first wall in an insulated manner, the electrode terminal is the first electrode lead-out portion, and the first wall is the second electrode lead-out portion;
an end cover covering the opening, wherein the end cover is provided with a pressure relief portion, and the pressure relief portion is configured to be capable of relieving an internal pressure of the battery cell;
an electrode assembly accommodated in the accommodating cavity, wherein the electrode assembly comprises a main body part, a first tab, and a second tab, the first tab and the second tab have opposite polarities, the first tab and the second tab are both arranged at one end of the main body part away from the end cover in the first direction, and the first tab and the second tab are electrically connected to the first electrode lead-out portion and the second electrode lead-out portion, respectively;
a first current collecting member arranged between the first wall and the electrode assembly, wherein the first current collecting member connects the first tab and the electrode terminal; and
a second current collecting member arranged between the first wall and the electrode assembly, wherein the second current collecting member and the first current collecting member are arranged at an interval, and the second current collecting member connects the second tab and the first wall, in the first direction, a protrusion is arranged to protrude from one side of the second current collecting member facing the first wall, and the protrusion is connected to the first wall, in the first direction, a groove is formed in a region on one side of the second current collecting member away from the first wall and corresponding to the protrusion,
wherein the main body part is provided with a through hole, the through hole passes through both ends of the main body part in the first direction, the first current collecting member is welded to the electrode terminal to form a weld mark, and in the first direction, at least part of a projection of the weld mark is located in the through hole.

2. The battery cell according to claim 1, wherein the pressure relief portion and the end cover are integrally formed.

3. The battery cell according to claim 1, wherein the pressure relief portion and the end cover are separately arranged.

4. The battery cell according to claim 1, wherein the electrode assembly is a wound electrode assembly, and the through hole is a center hole of the main body part.

5. The battery cell according to claim 1, wherein the battery cell further comprises:
a first insulating member arranged between the electrode assembly and the first wall, wherein the first insulating member insulates and isolates the first current collecting member from the second current collecting member.

6. The battery cell according to claim 5, wherein the first insulating member is provided with a first mounting hole and a second mounting hole arranged at an interval, the first current collecting member is arranged in the first mounting hole, and the second current collecting member is arranged in the second mounting hole.

7. The battery cell according to claim 6, wherein the first insulating member comprises:
a first insulator of an annular structure; and a second insulator connected to the first insulator, wherein the second insulator is configured to separate an internal space of the first insulator into the first mounting hole and the second mounting hole, and the second insulator is located between the first current collecting member and the second current collecting member.

8. The battery cell according to claim 1, wherein in the first direction, the first current collecting member has a first surface facing the first wall, the electrode terminal is connected to the first surface, the second current collecting member has a second surface facing the first wall, and the protrusion is arranged on the second surface;

wherein the first surface is flush with the second surface; or in the first direction, the first surface is closer to the first wall than the second surface.

9. The battery cell according to claim 8, wherein in the first direction, the first tab has a third surface facing the first wall, the first current collecting member is connected to the third surface, the second tab has a fourth surface facing the first wall, and the second current collecting member is connected to the fourth surface;

wherein the third surface is flush with the fourth surface.

10. The battery cell according to claim 1, wherein the first wall and the second wall are separately arranged.

11. The battery cell according to claim 1, wherein the first wall and the second wall are integrally formed.

12. The battery cell according to claim 1, wherein in the first direction, a thickness of the end cover is $D_1$, meeting $0.3$ mm$\leq D_1 \leq 3.5$ mm.

13. The battery cell according to claim 1, wherein the battery cell is cylindrical, and a central axis of the battery cell extends in the first direction.

14. The battery cell according to claim 13, wherein a diameter of the battery cell is $D_2$, meeting $27$ mm$\leq D_2 \leq 100$ mm.

15. A battery, comprising the battery cell according to claim 1.

16. An electrical apparatus, comprising the battery cell according to claim 1, wherein the battery cell is configured to provide electric energy.

17. A battery cell, comprising:

a case assembly provided with an accommodating cavity having an opening formed therein, wherein the case assembly has a first electrode lead-out portion and a second electrode lead-out portion, in a first direction, the first electrode lead-out portion and the second electrode lead-out portion are both located at one end of the case assembly away from the opening, the case assembly comprises a case and an electrode terminal, the case comprises a first wall and a second wall, the second wall is arranged around the first wall, and in the first direction, one end of the second wall is connected to the first wall, and the other end encloses to form the opening, the first wall and the second wall jointly enclose to form the accommodating cavity, the electrode terminal is mounted on the first wall in an insulated manner, the electrode terminal is the first electrode lead-out portion, and the first wall is the second electrode lead-out portion;

an end cover covering the opening, wherein the end cover is provided with a pressure relief portion, and the pressure relief portion is configured to be capable of relieving an internal pressure of the battery cell;

an electrode assembly accommodated in the accommodating cavity, wherein the electrode assembly comprises a main body part, a first tab, and a second tab, the first tab and the second tab have opposite polarities, the first tab and the second tab are both arranged at one end of the main body part away from the end cover in the first direction, and the first tab and the second tab are electrically connected to the first electrode lead-out portion and the second electrode lead-out portion, respectively;

a first current collecting member arranged between the first wall and the electrode assembly, wherein the first current collecting member connects the first tab and the electrode terminal;

a second current collecting member arranged between the first wall and the electrode assembly, wherein the second current collecting member and the first current collecting member are arranged at an interval, and the second current collecting member connects the second tab and the first wall; and a first insulating member arranged between the electrode assembly and the first wall, wherein the first insulating member insulates and isolates the first current collecting member from the second current collecting member, the first insulating member is provided with a first mounting hole and a second mounting hole arranged at an interval, the first current collecting member is arranged in the first mounting hole, and the second current collecting member is arranged in the second mounting hole, the first insulating member comprises: a first insulator of an annular structure; and a second insulator connected to the first insulator, wherein the second insulator is configured to separate an internal space of the first insulator into the first mounting hole and the second mounting hole, and the second insulator is located between the first current collecting member and the second current collecting member, wherein the main body part is provided with a through hole, the through hole passes through both ends of the main body part in the first direction, the first current collecting member is welded to the electrode terminal to form a weld mark, and in the first direction, at least part of a projection of the weld mark is located in the through hole.

* * * * *